United States Patent
Jennings et al.

(10) Patent No.: US 8,892,620 B2
(45) Date of Patent: Nov. 18, 2014

(54) COMPUTER FOR AMDAHL-COMPLIANT ALGORITHMS LIKE MATRIX INVERSION

(75) Inventors: Earle Jennings, Somerset, CA (US);
George Landers, Tigard, OR (US)

(73) Assignee: QSigma, Inc., Sunnyvale, CA (US)

( * ) Notice: Subject to any disclaimer, the term of this patent is extended or adjusted under 35 U.S.C. 154(b) by 418 days.

(21) Appl. No.: 13/500,103

(22) PCT Filed: Oct. 7, 2010

(86) PCT No.: PCT/US2010/051876
§ 371 (c)(1),
(2), (4) Date: Apr. 4, 2012

(87) PCT Pub. No.: WO2011/044398
PCT Pub. Date: Apr. 14, 2011

(65) Prior Publication Data
US 2012/0203814 A1    Aug. 9, 2012

Related U.S. Application Data

(60) Provisional application No. 61/249,503, filed on Oct. 7, 2009, provisional application No. 61/301,945, filed on Feb. 5, 2010, provisional application No. 61/307,383, filed on Feb. 23, 2010.

(51) Int. Cl.
*G06F 7/00* (2006.01)
*G06F 17/16* (2006.01)

(52) U.S. Cl.
CPC ..................................... *G06F 17/16* (2013.01)
USPC ...................................................... 708/517

(58) Field of Classification Search
CPC ..... G06F 7/556; G06F 7/4833; G06F 1/0307; G06F 1/0356; H03M 7/50
USPC ...................................................... 708/517
See application file for complete search history.

(56) References Cited

U.S. PATENT DOCUMENTS

| | | | |
|---|---|---|---|
| 5,596,763 A | | 1/1997 | Guttag et al. |
| 5,657,263 A | * | 8/1997 | Lloyd et al. .................... 708/517 |
| 5,682,544 A | * | 10/1997 | Pechanek et al. ............... 712/16 |

(Continued)

FOREIGN PATENT DOCUMENTS

WO    WO 2004042599 A1 *    5/2004

OTHER PUBLICATIONS

Demirsoy and Langhammer, "Cholesky Decomposition using Fused Datapath Synthesis", FPGA'09, Feb. 22-24, 2009, Monterey, California, USA, pp. 241-244, Copyright 2009 ACM 978-1-60558-410-2/09/02.

*Primary Examiner* — Tan V. Mai
(74) *Attorney, Agent, or Firm* — Earle Jennings

(57) ABSTRACT

A family of computers is disclosed and claimed that supports simultaneous processes from the single core up to multi-chip Program Execution Systems (PES). The instruction processing of the instructed resources is local, dispensing with the need for large VLIW memories. The cores through the PES have maximum performance for Amdahl-compliant algorithms like matrix inversion, because the multiplications do not stall and the other circuitry keeps up. Cores with log based multiplication generators improve this performance by a factor of two for sine and cosine calculations in single precision floating point and have even greater performance for $\log_e$ and $e^x$ calculations. Apparatus specifying, simulating, and/or layouts of the computer (components) are disclosed. Apparatus the computer and/or its components are disclosed.

16 Claims, 20 Drawing Sheets

(56) References Cited

U.S. PATENT DOCUMENTS

| | | |
|---|---|---|
| 5,844,854 A | 12/1998 | Lee |
| 5,961,635 A | 10/1999 | Guttag et al. |
| 5,995,748 A | 11/1999 | Guttag et al. |
| 6,538,470 B1 | 3/2003 | Langhammer et al. |
| 6,556,044 B2 | 4/2003 | Langhammer et al. |
| 6,628,140 B2 | 9/2003 | Langhammer et al. |
| 6,675,187 B1 * | 1/2004 | Greenberger ................ 708/622 |
| 6,771,094 B1 | 8/2004 | Langhammer et al. |
| 6,781,408 B1 | 8/2004 | Langhammer |
| 7,590,676 B1 | 9/2009 | Langhammer |
| 7,680,873 B2 | 3/2010 | Pechanek et al. |
| 7,716,454 B2 | 5/2010 | Fitton |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,979,673 B2 | 7/2011 | Fitton |
| 8,041,759 B1 | 10/2011 | Langhammer et al. |
| 8,307,021 B1 | 11/2012 | Dhanoa et al. |
| 8,335,812 B2 | 12/2012 | Pechanek et al. |
| 8,359,458 B2 | 1/2013 | Fitton |
| 8,396,914 B1 | 3/2013 | Langhammer |
| 8,539,014 B2 | 9/2013 | Langhammer et al. |
| 8,539,016 B1 | 9/2013 | Langhammer |
| 8,555,031 B2 | 10/2013 | Fitton |
| 8,577,951 B1 | 11/2013 | Langhammer |
| 8,626,815 B1 | 1/2014 | Langhammer |
| 8,705,646 B1 | 4/2014 | Xu |
| 8,761,188 B1 | 6/2014 | Krikelis et al. |
| 8,762,443 B1 | 6/2014 | Kurtz |
| 8,782,115 B1 | 7/2014 | Dhanoa |
| 2002/0089348 A1 | 7/2002 | Langhammer |
| 2002/0169813 A1 | 11/2002 | Pechanek et al. |
| 2003/0195938 A1 * | 10/2003 | Howard et al. ................ 709/208 |
| 2007/0185952 A1 | 8/2007 | Langhammer et al. |
| 2008/0133627 A1 | 6/2008 | Langhammer et al. |
| 2008/0263118 A1 * | 10/2008 | Montvelishsky ............. 708/420 |
| 2009/0240917 A1 | 9/2009 | Fitton |
| 2010/0121899 A1 | 5/2010 | Pechanek et al. |
| 2010/0223445 A1 | 9/2010 | Fitton |
| 2011/0087815 A1 * | 4/2011 | Kruglick ....................... 710/260 |
| 2011/0238720 A1 | 9/2011 | Langhammer et al. |
| 2012/0011344 A1 | 1/2012 | Fitton |

* cited by examiner

Fig. 3A

| 1st Local process index | 2nd Local process index |
|---|---|
| 1st Inst 0 | 2nd Inst 0 |
| 1st Inst 1 | 2nd Inst 1 |
| 1st Inst 2 | 2nd Inst 2 |
| 1st Inst 3 | 2nd Inst 3 |
| 1st Inst 4 | 2nd Inst 4 |
| 1st Inst 5 | 2nd Inst 5 |
| 1st Inst 6 | 2nd Inst 6 |
| 1st Inst 7 | 2nd Inst 7 |

Fig. 3B

Equivalent VLIW instruction memory

| 1st Inst 0 | 2nd Inst 0 | 1st inst 4 | 2nd Inst 0 |
|---|---|---|---|
| 1st Inst 0 | 2nd Inst 1 | 1st inst 4 | 2nd Inst 1 |
| 1st Inst 0 | 2nd Inst 2 | 1st inst 4 | 2nd Inst 2 |
| 1st Inst 0 | 2nd Inst 3 | 1st inst 4 | 2nd Inst 3 |
| 1st Inst 0 | 2nd Inst 4 | 1st inst 4 | 2nd Inst 4 |
| 1st Inst 0 | 2nd Inst 5 | 1st inst 4 | 2nd Inst 5 |
| 1st Inst 0 | 2nd Inst 6 | 1st inst 4 | 2nd Inst 6 |
| 1st Inst 0 | 2nd Inst 7 | 1st inst 4 | 2nd Inst 7 |
| 1st inst 1 | 2nd Inst 0 | 1st inst 5 | 2nd Inst 0 |
| 1st inst 1 | 2nd Inst 1 | 1st inst 5 | 2nd Inst 1 |
| 1st inst 1 | 2nd Inst 2 | 1st inst 5 | 2nd Inst 2 |
| 1st inst 1 | 2nd Inst 3 | 1st inst 5 | 2nd Inst 3 |
| 1st inst 1 | 2nd Inst 4 | 1st inst 5 | 2nd Inst 4 |
| 1st inst 1 | 2nd Inst 5 | 1st inst 5 | 2nd Inst 5 |
| 1st inst 1 | 2nd Inst 6 | 1st inst 5 | 2nd Inst 6 |
| 1st inst 1 | 2nd Inst 7 | 1st inst 5 | 2nd Inst 7 |
| 1st inst 2 | 2nd Inst 0 | 1st inst 6 | 2nd Inst 0 |
| 1st inst 2 | 2nd Inst 1 | 1st inst 6 | 2nd Inst 1 |
| 1st inst 2 | 2nd Inst 2 | 1st inst 6 | 2nd Inst 2 |
| 1st inst 2 | 2nd Inst 3 | 1st inst 6 | 2nd Inst 3 |
| 1st inst 2 | 2nd Inst 4 | 1st inst 6 | 2nd Inst 4 |
| 1st inst 2 | 2nd Inst 5 | 1st inst 6 | 2nd Inst 5 |
| 1st inst 2 | 2nd Inst 6 | 1st inst 6 | 2nd Inst 6 |
| 1st inst 2 | 2nd Inst 7 | 1st inst 6 | 2nd Inst 7 |
| 1st inst 3 | 2nd Inst 0 | 1st inst 7 | 2nd Inst 0 |
| 1st inst 3 | 2nd Inst 1 | 1st inst 7 | 2nd Inst 1 |
| 1st inst 3 | 2nd Inst 2 | 1st inst 7 | 2nd Inst 2 |
| 1st inst 3 | 2nd Inst 3 | 1st inst 7 | 2nd Inst 3 |
| 1st inst 3 | 2nd Inst 4 | 1st inst 7 | 2nd Inst 4 |
| 1st inst 3 | 2nd Inst 5 | 1st inst 7 | 2nd Inst 5 |
| 1st inst 3 | 2nd Inst 6 | 1st inst 7 | 2nd Inst 6 |
| 1st inst 3 | 2nd Inst 7 | 1st inst 7 | 2nd Inst 7 |

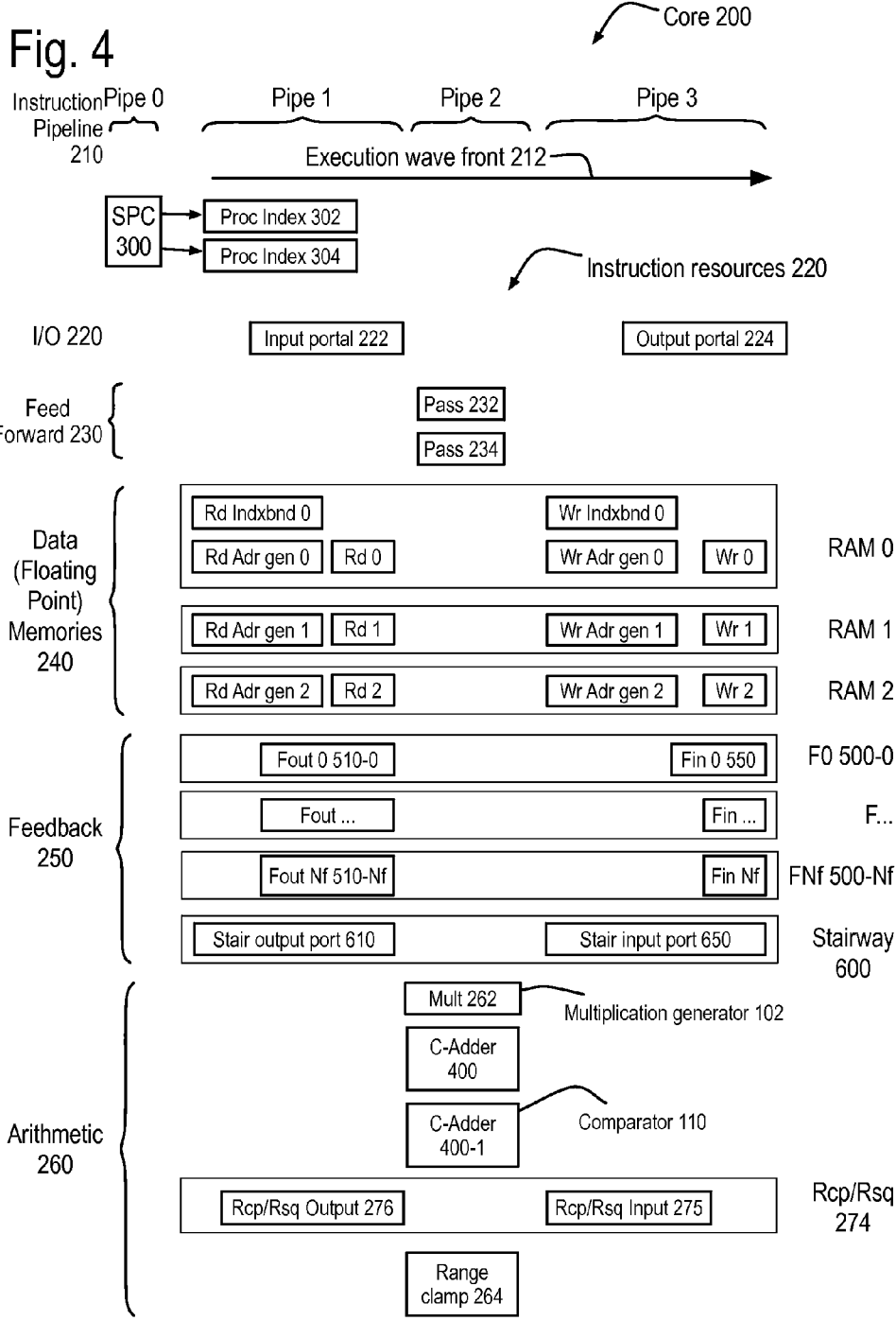

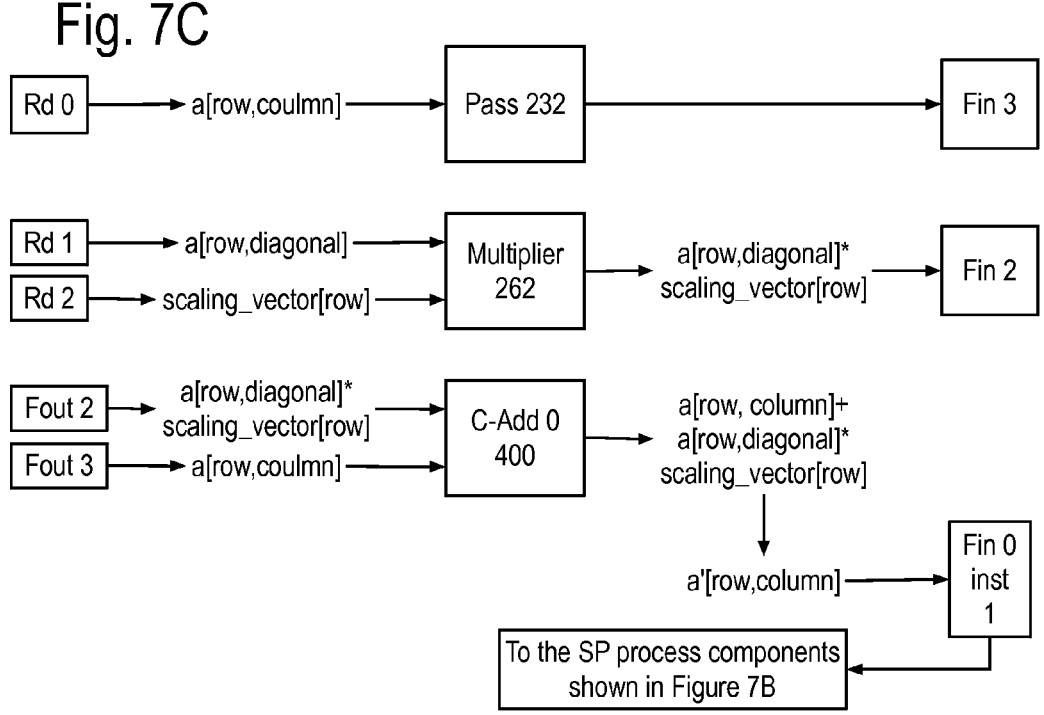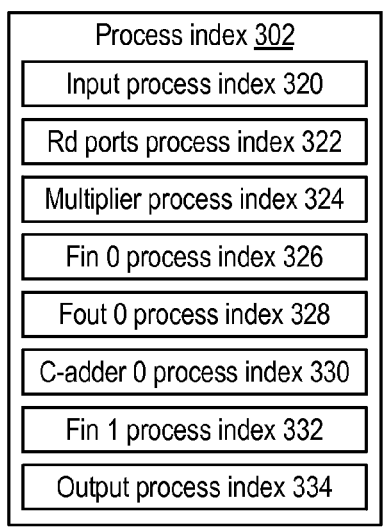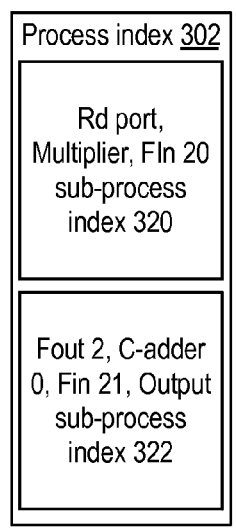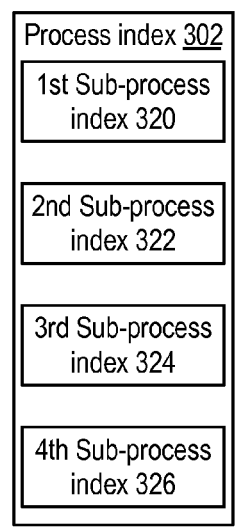

Fig. 9F
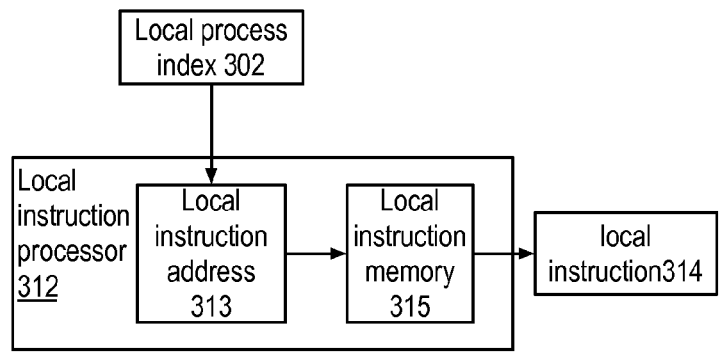
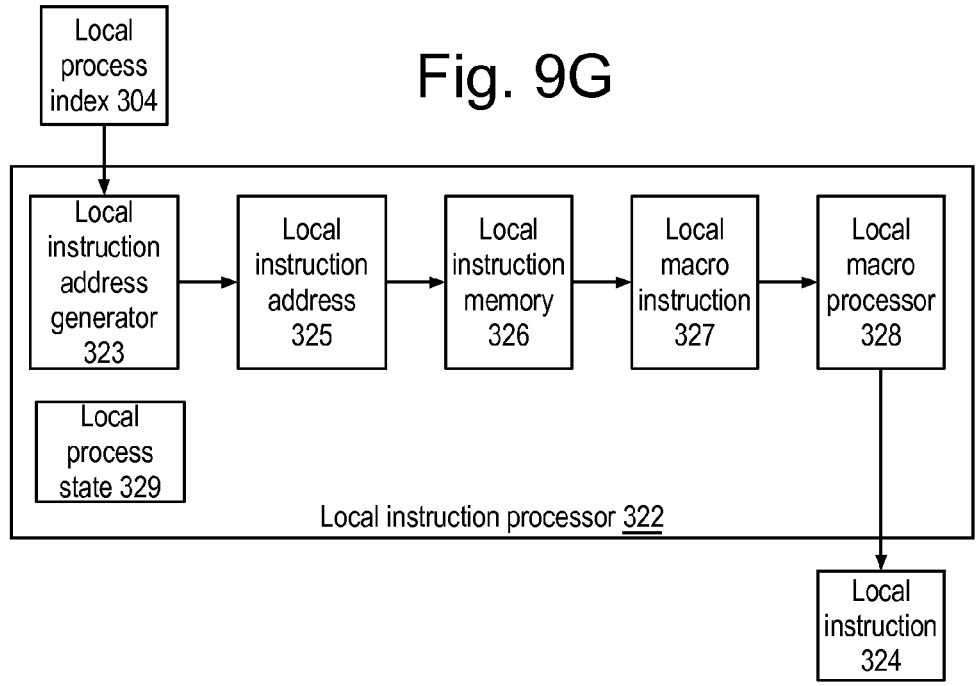
Fig. 9G

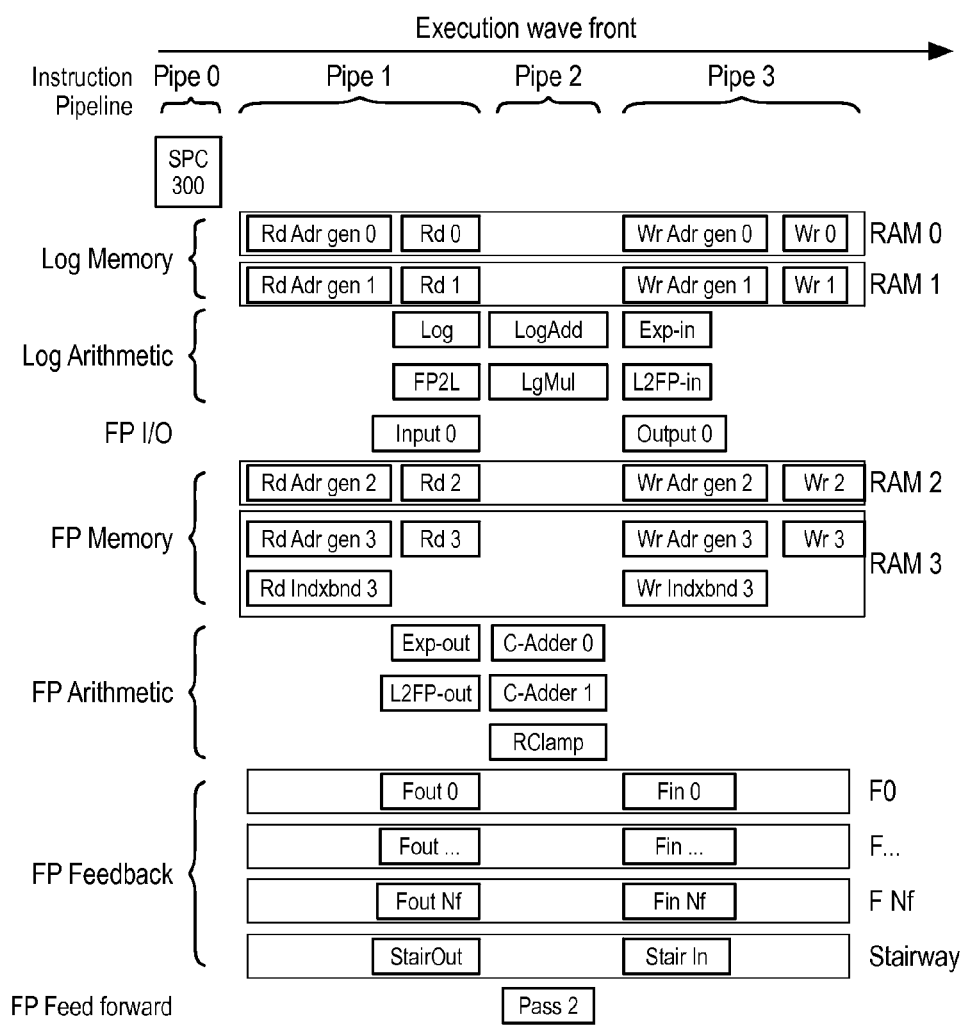

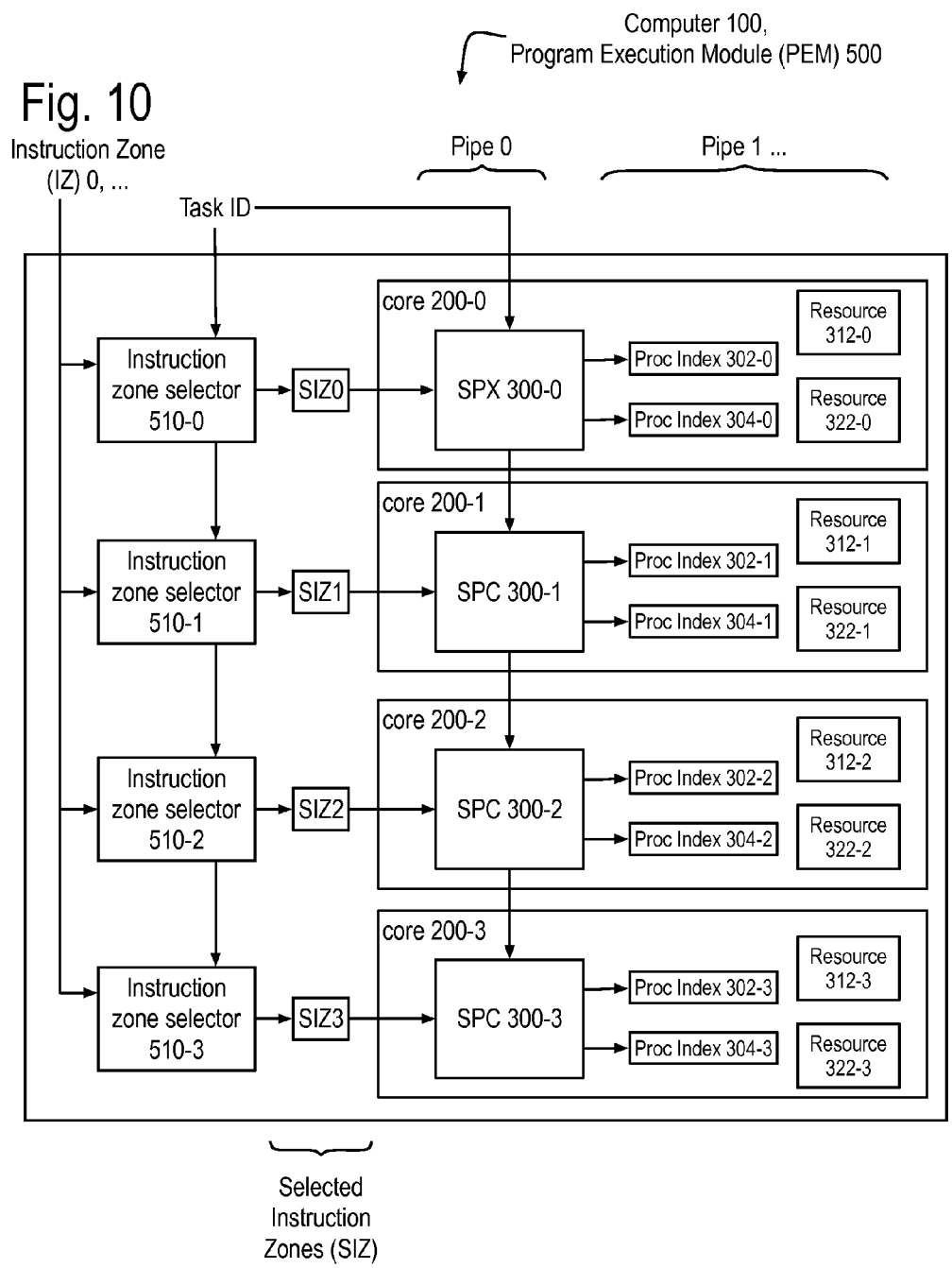

COMPUTER FOR AMDAHL-COMPLIANT ALGORITHMS LIKE MATRIX INVERSION

CROSS-REFERENCE TO RELATED APPLICATIONS

This application claims priority to the following: U.S. Provisional Patent Application Ser. No. 61/249,503, filed Oct. 7, 2009, U.S. Provisional Patent Application Ser. No. 61/301,945, filed Feb. 5, 2010, and U.S. Provisional Patent Application Ser. No. 61/307,383, filed Feb. 23, 2010, all of which are incorporated herein by reference in their entirety.

TECHNICAL FIELD

This disclosure relates to computers configured to perform Amdahl-compliant algorithms like matrix inversion without stalling the generation of multiplications more than ten percent of the time, from a single core to multiple cores per chip, and from single chips to multiple chip systems executing the matrix inversion. This disclosure also relates to computers configured to perform Floating Point (FP) Finite Impulse Response (FIR) filters at the same or better multiplier performance across the same of similar core and chip configurations.

BACKGROUND

By the mid-1940's, computers stored programs in memories as instructions to fetch and execute. By the end of the 1950's the semiconductor revolution was well underway leading to the building blocks of computers becoming smaller, faster and more power efficient. These two fundamental innovations converged with the introduction of all-semiconductor computers by the early 1960's starting with Seymour Cray's CDC-1604, revolutionizing technology, commerce and culture.

The 1960's also saw the first multi-tasking operating systems as demonstrated by the Compatible Time-Sharing System at MIT, the first parallel processor, the Burroughs D825 in 1962, and the first supercomputer, the CDC 6600 introduced in 1964. But even then, Gene Amdahl predicted, in Amdahl's Law, a fundamental limitation to the performance of parallel processors.

Amdahl's Law states that if an algorithm can be decomposed into a parallelizable part that takes up a fraction P of the total time to execute the algorithm and a sequential part that takes up the remaining execution time, then the maximum performance improvement has an asymptotic limit of $1/(1-P)$ as the parallel part is driven to essentially 0. So if the algorithm is 90% parallelizable, then the maximum performance improvement is a factor of 10. Now, over forty years later, we see the limits he predicted every time we buy a quad core computer and do not get four times the performance of the replaced single core computer.

A somewhat lesser known conclusion is Pollack's Rule, which states that "microprocessor performance increase is roughly proportional to [the] square root of [the] increase in complexity, [which] contrasts with power consumption increase, which is roughly linearly proportional to the increase in complexity." Complexity in this context means processor logic, i.e its area. The rule, which is an industry term, is named for Fred Pollack, a lead engineer and fellow at Intel.

Seymour Cray knew that for a computer to run as fast as possible, the entire system had to be fast, not just the CPU. Many approaches have been tried to maximize system performance and throughput, always running into the problem of Amdahl's Law. Significant advances in future computing performance require a new, fundamental approach to computer design.

SUMMARY OF THE INVENTION

At first glance, Pollack's Rule does not tell us what happens with N instances of a microprocessor, so why mention it? The reason: the microprocessor is the standard Program Execution Unit (PEU). A microprocessor made 64 times more complex, is 8× faster. A PEU using 64 instances of this disclosure's cores can perform matrix inversion without stalling the multipliers, with 64× performance of the single core, or 8× the microprocessor.

A family of computers is disclosed and claimed that supports simultaneous processes from the single core up to multi-chip Program Execution Systems (PES). The instruction processing of the instructed resources is local, dispensing with the need for large VLIW memories. The cores through the PES have maximum performance for matrix inversion, because the multiplications do not stall and the other circuitry keeps up. Cores and so on with log based multiplication generators improve this performance by a factor of two for sine and cosine calculations in single precision floating point and have even greater performance improvement for $\log_e$ and $e^x$ calculations.

Feedback is external to arithmetic resources, allowing the arithmetic to run at full speed without constraints due to the placement of feedback paths. Feedback throughout a large multi-core and/or multi-chip system is sequential and by using a bi-directional, binary tree system of input/output ports, called stairways, and collection-distribution nodes called landings, feedback latency is proportional to $\log_2$ of the number of cores per chip and the number of chips being traversed.

At each stage of integration, Amdahl's Law is broken for at least matrix inversion. An extension of feedback queues triggering interrupts, stimulates these simultaneous processes in terms of data availability, and in some embodiments, may be the only stimulus needed to control some or all of a process' instructed resources. Memory access is disclosed that keeps the multiplications from stalling and keeps up with the generation of those multiplications. A software methodology is disclosed that extends across the whole family. Many branching operations are either been transformed into arithmetic operations that can be cascaded or optimized to support continuous throughput so that these activities no longer stall.

Real-time control and DSP systems will benefit. Supercomputers will need at least these innovations to overcome today's performance problems. Cellular phones, wireless network devices, disk drives, base stations and wireless access points all benefit from improved signal to noise effects resulting from floating point versus fixed point signal processing.

BRIEF DESCRIPTION OF THE DRAWINGS

FIGS. 3A and 3B show through their examples why large VLIW memories are not needed for the disclosed computer and the core.

FIG. 4 shows a simplified block diagram of the core including an instruction pipeline starting in pipe 0 with the simultaneous process calculator issuing the process indexes for execution in successive instruction pipe stages by the instruction resources of the two simultaneous processes with the multiplication generator implemented as a multiplier and the comparator implemented as a comparison capable adder.

FIGS. 6A and 6B are also relevant to the input portal as well as other instructed resources.

FIGS. 7A to 7C show examples of simultaneous processes that may be organized as sub processes.

FIGS. 8A to 8C show some examples of one of the process index including multiple sub-process indexes.

FIG. 9F and FIG. 9G shows some details of examples of local instruction processors.

FIG. 9H shows some details of a second example of a core including a multiplication generator that uses an exponential calculator configured to receive a log-based result to generate the multiplication.

FIG. 10 shows some details of a program execution module (PEM) including multiple instances of the cores, distributing selected instruction zones in response to the task ID for the first example of a multi-tasking system.

DETAILED DESCRIPTION

Today, the term computer typically refers to a device that accesses a program stored in some form of memory to fetch and execute instructions. The limitations described by Amdahl's law are inherent in this definition of a computer. This disclosure will define a computer as including at least one data processor and at least one instruction processor, with each data processor instructed by at least one of the instruction processors. This definition encompasses all previous computer architectures, but provides some new tools.

This disclosure starts with simultaneous processes, the basics of their implementation in a core, and some fundamental advantages they bring. A first example core discloses using multipliers, in particular floating point (FP) multipliers to generate the multiplications and introduces the concepts of an execution wave front traversing the instruction pipeline, local instruction processing for instructed resources of each simultaneous process with detailed walkthroughs of the comparison capable adders, in particular supporting scaled operands of more than two inputs to the adder, and the feedback paths implemented externally to the arithmetic circuitry such as the adders. The memory access discussion will focus on one core with walkthroughs from matrix inversion and Finite Impulse Filter (FIR) calculations being discussed to show how the pieces work together in the example of core.

Figure 1:
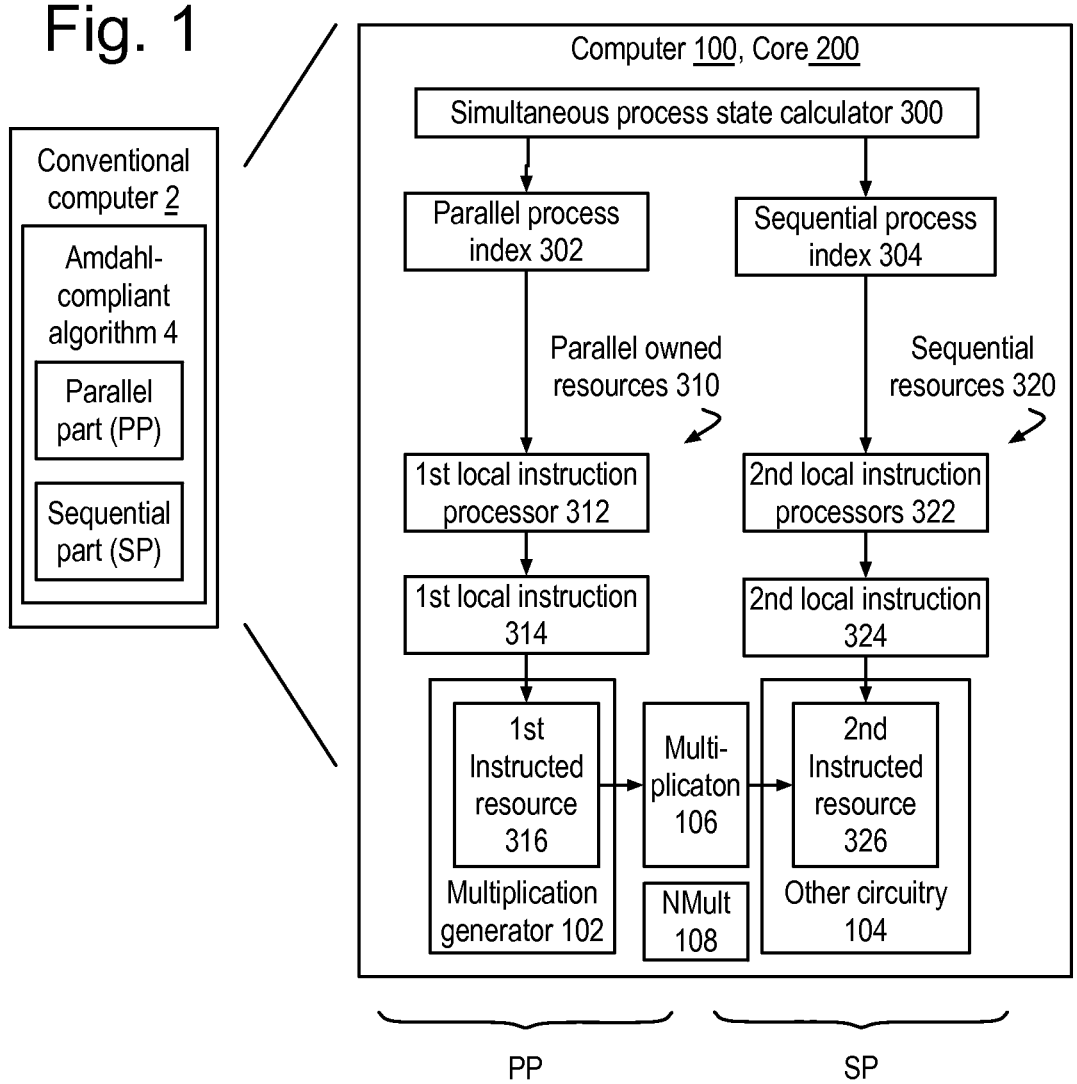
FIG. 1 shows an example of a conventional computer implementing an Amdahl-compliant algorithm and an example of this disclosure's computer and core implementing simultaneous processes that remove the constraints of Amdahl's Law for at least matrix inversion.

FIG. 1 shows an example of a conventional computer 2 implementing an Amdahl-compliant algorithm 4 as well as an example of this disclosure's computer 100 that removes the constraints of Amdahl's Law for at least matrix inversion. Each Amdahl-compliant algorithm 4 includes by definition a Parallel Part (PP) and a Sequential Part (SP). The computer 100 may be configured to operate at least one multiplication generator 102 the generates a multiplication 106 and to operate other circuitry 104 that responds to the multiplications 106. The computer 100 may be configured to operate so that the multiplications 106 stall less than NMult 108 percent of the time and the other circuitry 104 keeps up with the multiplications.

FIG. 1 also shows the computer 100 may include a core 200 that includes at least one of the multiplication generators 102 and at least part of the other circuits 104. The computer 100 and the core 200 are both configured to operate with the multiplications 106 stalling less than NMult 108 percent of the time, where NMult is at most ten percent.

While there is much to discuss, the disclosure will begin with a discussion of simultaneous processes. The computer 100 and/or the core 200 may include a simultaneous process calculator 300 configured to generate the parallel process index 302 and the sequential process index 304.

Each process index 302 and 304 is used by the local instruction processor 312 and 314 of its owned instructed resources 316 and 326 to create a local instruction 314 and 324 for the resources 316 and 326 to contribute to executing the simultaneous processes PP and SP.

Owned resources 310 of the parallel process are configured to receive the parallel process index 302. These parallel owned resources 310 include at least one local instruction processor 312 that use the parallel process index 302 to generate the first local instruction 314 that directs at least one of the first instructed resources 316. The first instructed resource 316 is shown here as the multiplication generator 102.

Owned resources 320 of the sequential process are configured to receive the sequential process index 304. These sequential owned resources 320 include at least one of a second local instruction processor 322 that use the sequential process index 304 to generate the second local instruction 324 that directs at least one of the second instructed resources 326. The other circuitry 104 is shown here to include the second instructed resource 326.

This basic reorganization makes instruction processing local to each data processor resource, such as a data memory port, an adder, and so on, which we will call instructed resources from hereon.

The computer 100 and the core 200 support multiple simultaneously executing processes, which we call simultaneous processes. Each process owns separate instructed resources so that the Parallel Part (PP) and the Sequential Part (SP) need not stall each other.

The computer 100 is based upon the cores 200 generating multiple process indexes 302 and 304 to direct the local instruction processing 312 and 322 of the owned instructed resources 310 and 320 of two or more simultaneous processes, shown here through the example of the Parallel Part (PP) and the Sequential Part (SP) of an Amdahl-compliant algorithm in a conventional computer. By way of example, a conventional computer 2 may include at least one instance of at least one of a Single Instruction Single Data stream (SISD), a Single Instruction Multiple Data stream (SIMD), a Multiple Instruction Single Data stream (MISD), a Multiple Instruction Multiple Data stream (MIMD) and a Very Long Instruction Word (VLIW) computer.

Figure 2:
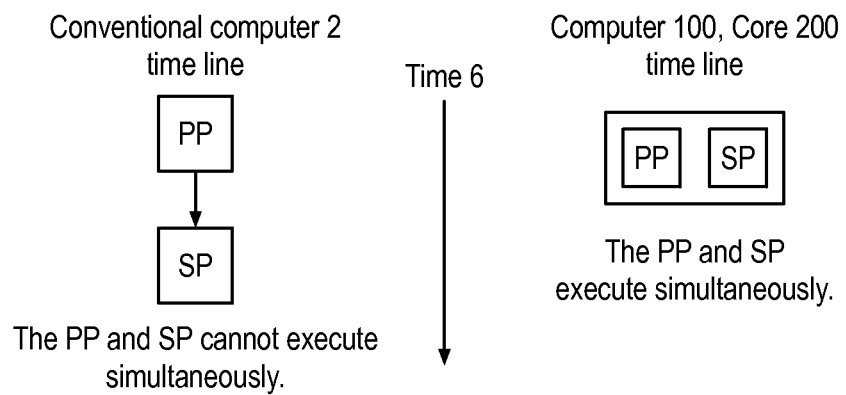
FIG. 2 shows that the computer and/or core simultaneously perform both processes PP and SP compared to the conventional computer that can only execute, at most, one of the processes at a time.

These basic decisions bring substantial benefits: FIG. 2 shows that the computer 100 and/or core 200 simultaneously perform both processes PP and SP compared to the conventional computer 2 that can only execute, at most, one of the processes at a time.

Assume that the PP and SP processes each have a range of 8 instructions. The core 200 is driven by separately accessible, process-owned local instructions shown in FIG. 3A. A VLIW instruction memory supporting independent operations would require 64 instructions, as in FIG. 3B. The simultaneous processes and the local instructions for their owned instructed resources remove the otherwise required, large VLIW memories, and the need for instruction caching.

Within this new paradigm, it becomes possible to create computers 100 that function like number factories analogous to an automobile assembly facility, where parts arrive on time at workstations so that the production flow of the workstation is never disrupted. This is done by providing resources, feedback, communication and control tools that can be configured, for a targeted cross section of algorithms, to keep the bottleneck resources of these number factories from stalling.

This disclosure focuses on algorithms with significantly obstructed multiplications in conventional computers 2 and on the computers 100 that remove these obstructions and insure that the rest of the circuitry keeps up. The throughput for these algorithms is then the number of clock cycles per second, times the number of multiplications generated per clock cycle, divided by the number of multiplications required for the algorithm. Families of computers 100 that vary from generating one multiplication per clock cycle to N multiplications per clock cycle will show a linear performance improvement for the implemented algorithm.

Matrix inversion can be seen as an Amdahl-compliant algorithm 4, an algorithm with sequential part SP and a parallelizable part PP. Consider the following pseudo-code for a sequential implementation of matrix inversion of an input matrix In[0 ... N−1,0 ... N−1] with an internal augmented matrix A[0 ... N−1,0 ... 2N−1]:

```
Make augmented matrix A from input matrix
For diagonal= 0 to N−1
    Find pivot row in diagonal column from diagonal row to N−1 row
    scale_factor = 1/A[pivot row, diagonal]
    Make scaling vector for diagonal column, scale_factor and
    pivot_row
    Row adjust all rows of A using diagonal, pivot row and scaling
    vector
Endfor
```

There is a more detailed discussion of matrix inversion in each of the provisional patent applications incorporated. In particular, the U.S. Provisional Patent Application Ser. No. 61/307,383, filed Feb. 23, 2010, of which pages 20 and 21 of the specification and pages 29 to 36 of the Figures are potentially relevant and incorporated herein by reference.

The parallelizable part PP of this algorithm 4 includes the row-adjust and making the scaling vector steps, both requiring multiplications, and adds for row-adjust, that may be performed in parallel. The sequential part SP finds the pivot entry by comparing all elements of the diagonal column that are at or below the diagonal row to find a maximal entry without regard to its sign.

In conventional computers 2, finding the pivot means that one arithmetic comparison needs to be performed and then the results of that comparison used to branch, then another comparison performed, and so on. The sequential part SP obstructs the multipliers when matrix inversion is implemented in a single core, which is removed by simultaneously performing the sequential part invisible to the parallel part as shown in FIG. 2. Conventional cores 2 cannot support concurrent processes that simultaneously execute their operations. From the start, they cannot help but stall the parallelizable part PP when executing the sequential part SP of an Amdahl-compliant algorithm 4. One of the disclosed cores 200 is inherently more efficient than conventional core 2 because the sequential part SP never stalls the parallelizable part PP. Because the multiplications do not stall, a performance improvement of N can be achieved with N of the disclosed cores 200.

FIG. 4 shows a simplified block diagram of the core 200 including an instruction pipeline 210 starting in pipe 0 with the Simultaneous Process Calculator (SPC) 300 issuing the process indexes 302 and 304 for execution as an execution wave front 212 in successive instruction pipe stages by the instruction resources 220 of the two simultaneous processes. In this example there are four pipe stages. Pipe 0 that calculates the process indexes 302 and 304. The instruction resources 220 may include distinct parallel owned resource 310 and sequential part owned resources 320 of FIG. 1. The boxes with references numbers below the instructed resources 220 arrow are all examples of the instructed resources which will be discussed in greater detail shortly.

Pipe 1 uses the process indexes 302 and 304 to execute the input portal 222, the read ports of the data memories 240, the output ports of the feedback 250 and the output port 276 of the Reciprocal-Reciprocal square root (Rcp/Rsq) circuit 274.

The feedback 250 includes local feedback 500-0 to 500-Nf and external feedback through a stairway 600.

The output port of internal feedback 500-0 is Fout 0 510-0, and so on, to the output port Fout Nf 510-Nf for internal feedback 510-Nf.

The stairway 600 includes a stairway output port 610.

The input portal 222, the local feedback output ports Fout-0 to Fout-Nf, the external feedback (Stairway) output port 610 and the Rcp/Rsq output port 274 all act to output numbers and/or operand packages 402 which will be discussed shortly in FIG. 5A.

Pipe 2 uses the process indexes 302 and 304 to execute the feed forward 230 circuits referred to as pass circuits 232 and 234, the multiplication generator, in this example, a floating point multiplier 262, two comparison capable adders (C-Adder) 270 and 272 as well as a range clamp 264.

Pipe 3 uses the process indexes 302 and 304 to execute the output port 224, the write ports of the data memories 240, the input ports of the feedback 250 and the input port 275 of the reciprocal-reciprocal square root circuit 274.

The instructed resources 220 are arranged in instruction pipes 1 to 3 and may execute the process indexes 302 as the execution wave front 212 passing through each instruction pipe in a fixed sequence shown here progressing successively from left to right. The execution waves are generated on each clock cycle by continuously calculating 300 the process indexes 302 and 304 in the instruction pipe 0 to support a simple flat time execution paradigm. This not only simplifies the programming, but also optimizes concurrency and task switching properties. The execution wave front 212 insures all data results coming out of each instruction pipe are based on data that went into the instruction pipe at the same time. Further simplicity results from requiring the inputs of each instruction pipe come from the outputs of the previous instruction pipe.

Each of the instructed resources 220 is instructed by a local instruction 314 or 324 generated in response to the process index 302 or 304 of the owning simultaneous process. Both the parallelizable part PP and the sequential part SP may be implemented as simultaneous processes that do not stall each other to execute. Locally generated instructions selected from multiple process indexes insure operational diversity in controlling the resources while minimizing instruction redundancy. Matrix inversion requires less than 24 local instructions for any of the instructed resources. Large external VLIW memories and instruction caches can be eliminated in real-time Digital Signal Processing (DSP).

Floating point adders 270 and/or 272 may not include internal feedback paths, because a floating point adder operating at 200 MHz is unlikely to have the same pipe stages as one operating at 2 GHz. Instead of internal feedback, each feedback path, for example feedback path F0, is made external to the arithmetic units and partitioned into separate instructed resources, with Fin 0 configured to receive input and Fout 0 providing output for the feedback path F0. Simultaneous processes, like the parallelizable process PP and the sequential process SP of matrix inversion, communicate through the separately owned input Fin and output ports Fout of the feedback paths F0 to FNf in the core 200.

All feedback 250 is done external to the floating point (FP) adders 270 and 272, with the operation of accumulating feedback triggered by the state of queues of the feedback 250, which will be discussed shortly. This supports FP multiply-accumulate operations running at the speed of the multiplier without concern for how the adders 270 and 272 are implemented.

Communication between the parallel part PP and the sequential part SP may be through the feedback 250 with queue status triggering actions in the receiving process, which will be described in greater detail shortly regarding FIG. 5H to 5K.

These features of all the feedback 250 being external to the adders, the adders 270 and/or 272 support comparison capable operations that can cascade partial comparison results to form the pivot of the next column for matrix inversion, and communication between the processes being implemented by queue status triggering actions in the receiving process, combine in the single core 200 so that the sequential part SP does not slow down the parallel part PP. By extending these features and performing the comparisons locally as much as possible, each implementation at the module, chip and multi-chip system level can be proven to support the sequential part keeping up with the parallel part, so that the multipliers never stall and the rest of the circuitry has kept up. Each implementation involving multiple cores has a linear performance improvement over the single core and Amdahl's Law is broken.

The core 200 contains two adders 270 and 272, one can be owned by the parallel part PP, and the other owned by the sequential part SP. The parallel part also owns the multiplier 260. To simplify programming, both adders 270 and 272 may support the same range of operations. These include an inline comparison that may be chained without branching to calculate the pivot for matrix inversion.

FIGS. 5A to 5G show some details of the comparative adder 400 of FIG. 4. The basic comparison step in the conventional computer 2 involves fetching one number to a register and performing one add which must be completed before a branch is taken. On completing the branch, temporary registers for the data and the array index must be updated before the step is iterated (assuming the comparison loop has been unrolled). While the conventional computer 2 may be a super-scalar microprocessor, the out of order instruction execution mechanism cannot proceed to bind the registers without knowing the result of the comparison, and no matter how fast the cache, it still takes a few cycles to get the fetch and bookkeeping operations out of the way.

Figure 5A:
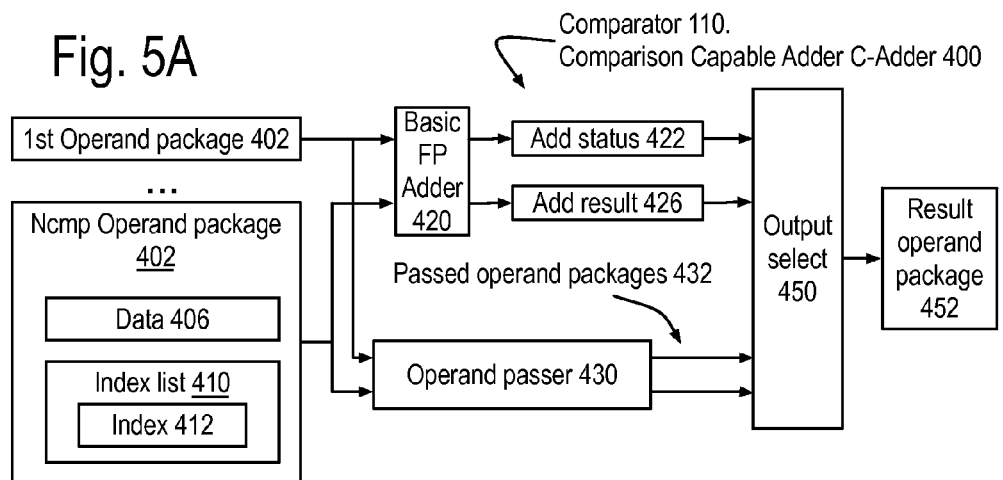
FIGS. 5A to 5G show some details of the comparative adder of FIG. 4.

FIG. 5A shows a block diagram of the comparison capable adder (C-adder) 400 that can receive two or more operand packages 402, each containing not only data 406 but also an index list 410 that can identify its entry in a vector or array, possibly as an index 412. The basic adder 420 performs a local instruction which is not shown to create an additive result 426 with condition flags such as zero-detect, positive and negative as the adder status 422. An operand passer 430 passes forward the operand packages 402 to create passed operand packages 432. An adder output stage 450 operates upon a second component of the local instruction, which is also not shown, to create a result operand package 452 in response to the passed operand packages 432, the adder result 426 and the adder status 422. This circuit can be used to convert the pivot calculation of matrix inversion into a set of chained comparison arithmetic operations without branching, further optimizing the sequential part SP of matrix inversion and many other algorithms in single or multi-core implementations.

Figure 5B:
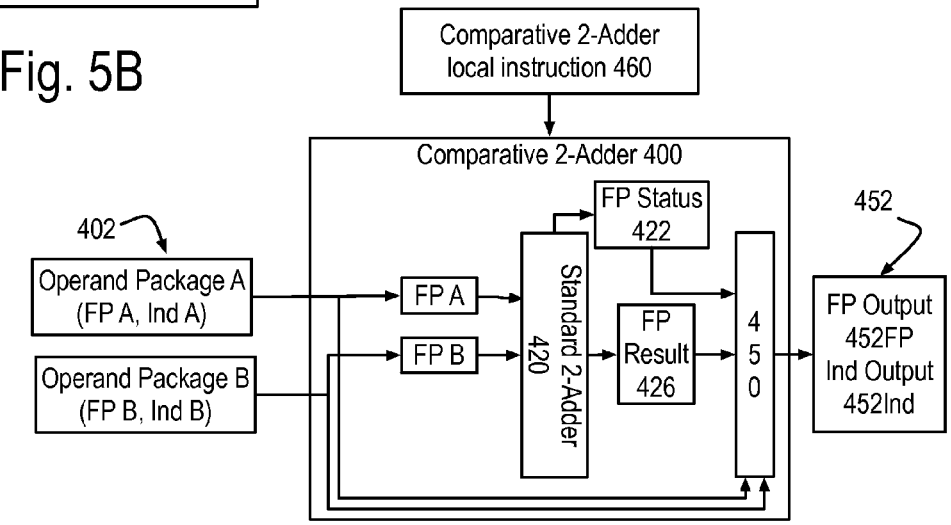

FIG. 5B shows an example comparative 2 operand adder 400 that receives its comparative 2-Adder local instruction 460 directing its operations on operand packages 402 A and B, each of which contains a FP number as the data 406 and its own index list 410. The operand packages A and B are presented to a standard 2-operand adder 420 as well as synchronously passed around 430 the adder's 420 generation of a FP status 422 and a FP result 426, all of which are simultaneously presented to an output selector 450 to generate an output operand package 452 with its FP output 452FP and Output index list 452Ind. Note that this Figure does not show how the operand packages are generated, which may typically be done by selecting an output of a previous pipe stage, a read port, a queue output, or from a forcing circuit that may generate specialized constants such as 0.0, 1.0, pi (3.14159), etc.

Figure 5C:
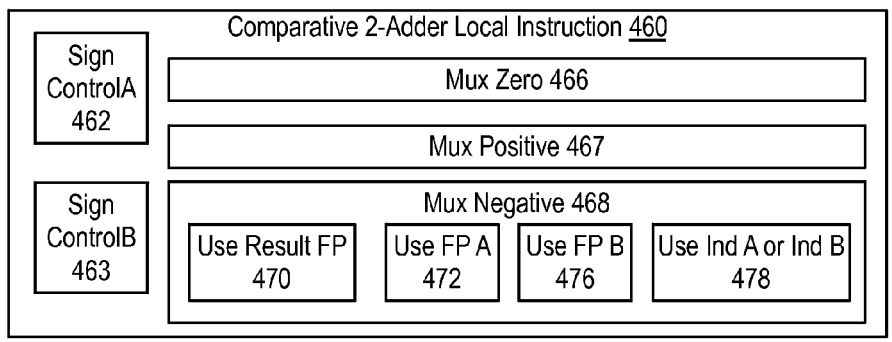

FIG. 5C shows an example of the comparative 2-adder local instruction 460 of FIG. 5B. Sign Control A 462 may act to force FP A to be positive, negative, negate it or pass it unchanged. Sign control B 463 may have a similar effect on FP B. Mux Zero 466, Mux Positive 467, and Mux Negative 468 direct the output selector 450 based upon the FP status 422, which will in some form report that the FP result 426 is zero, positive or negative. Each of them 466, 467 and 468 may contain some form of the following: A FP output select component shown here as Use Result FP 470, Use FP A 472 and Use FP B 476, which may be coded as a one-hot or one-cold scheme, and an index list selector 478 shown in the Figure as Use Ind A or Use Ind B.

There are several topics regarding the local instruction 460, that while useful, makes the discussion of the comparative adder 400 more complex, and will not be further discussed than the next few paragraphs for reasons of clarity. However one of skill in the art will recognize that the scope of the comparison adders 400 includes such implementations:

It may often be useful for the sign control 462 and 463 to further include forcing the sign positive and forcing the sign negative, so that comparisons of absolute numbers may be implemented. Comparing of absolute values of numbers are often used in implementations of matrix inversion to find the pivot for the next row-adjustment step.

Another useful extension of the local instruction 460 allows each selected operand package 402 to be interrogated to determine if one or more of the indexes 412 in the index lists 410 meets a specific condition, such as being larger than diagonal row of the matrix. Once such a determination is made the condition is met, specialized activities may be triggered, such as forcing the data 406 to be set to 0.0. This acts to suppress the rows which may no longer considered as the pivot, while possibly simplifying the instruction coding of the various instruction resources.

Figure 5D:
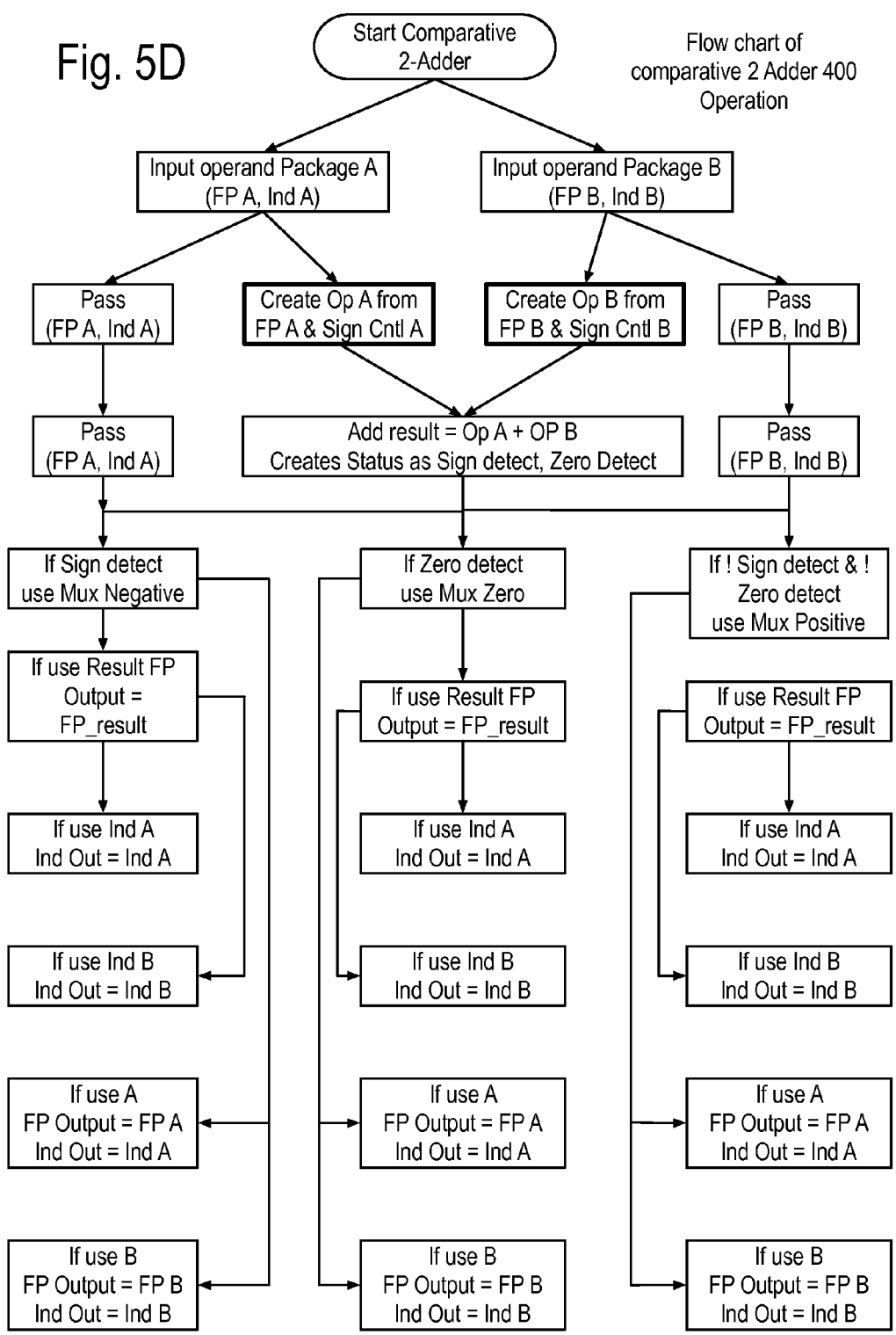

FIG. 5D shows in a flowchart fashion the operations just described for the comparative 2 operand adder 400 in FIG. 5B responding to the comparative 2-adder local instruction 460 of FIG. 5C. The following table will exercise this flowchart and show how the local instruction 460 of FIG. 5C directs the activities of the comparative 2 operand adder 400. Only the Mux control that is being used will be shown so if the add result 426 is Zero, Mux Zero 466 will be shown.

| Sign Control | | MuxNegative 468 | | | |
|---|---|---|---|---|---|
| | | | Use FP | | |
| A 462 Subtract (1) | B 463 Add (0) | UseResult 470 False | Use FP A 472 True | B 476 False | Use Ind 478 B(1) |
| Operand A | Operand B | Add result 426 | Add status 422 | Result Operand 452 | |
| FP A = 2 Ind A = 1 | FP B = 1.25 Ind B = 2 | −0.75 | Negative (sign detect) | FP = 2, Ind = 2 | |

| Sign Control | | MuxZero 466 | | | |
|---|---|---|---|---|---|
| | | | Use FP | | |
| A 462 Add (0) | B 463 Subtract (1) | UseResult 470 True | Use FP A 472 False | B 476 False | Use Ind 478 A(0) |
| Operand A | Operand B | Add result 426 | Add status 422 | Result Operand 452 | |
| FP A = 1.25 Ind A = 1 | FP B = 1.25 Ind B = 2 | 0.0 | Zero (Zero detect) | FP = 0.0, Ind = 1 | |

| Sign Control | | MuxPositive 467 | | | |
|---|---|---|---|---|---|
| A 462 Add (0) | B 463 Subtract (1) | UseResult 470 False | Use FP A 472 False | Use FP B 476 True | Use Ind 478 B(1) |
| Operand A | Operand B | Add result 426 | Add status 422 | Result Operand 452 | |
| FP A = 2 Ind A = 1 | FP B = 1.25 Ind B = 2 | 0.75 | Positive (Zero False & Sign False) | FP = 1.25, Ind = 2 | |

Table One shows the operation of the comparative 2 adder 400 in each set of four rows. The first two rows show the active components of the local instruction 460. The next two rows show the names of the data components in the first row and their value in the second row underneath the name. The first set of four rows exercise the first column of operations after the formation of the FP_result 426 and status 422 and passing in the flowchart of FIG. 5D. The second set of four rows exercise the second column from the same place in the flow chart. The third set of four rows exercise the third column.

Figure 5E:
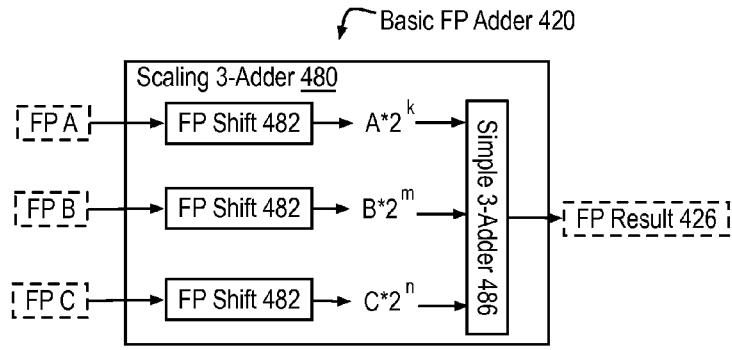

FIG. 5E shows a block diagram of the basic FP adder 420 implemented as a scaling 3 operand adder 480 including FP shifters 482 to scale by small powers of two the three operands FP A, FP B, and FP C presented to the scaling 3 operand adder 480. The scaled operands $A*2^k$, $B*2^m$ and $C*2^n$ are then presented to a 3-operand floating adder 486 to create its FP result 426. By way of example, k, m and n may each range over a five bit field that is offset to provide the range of integers from +5 to −26. This adder is further disclosed in pending U.S. patent application Ser. No. 11/380,613, filed Apr. 27, 2006, which is incorporated herein by reference in its entirety.

Figure 5F:
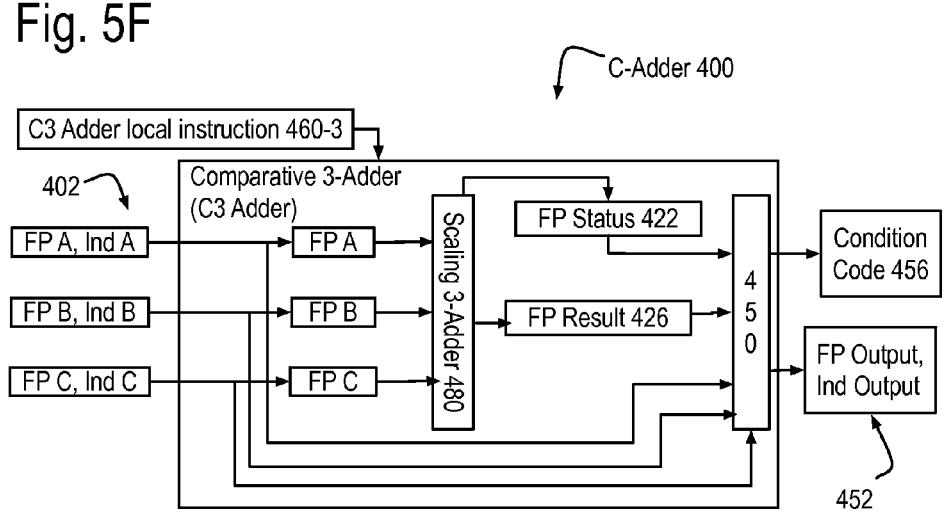

FIG. 5F shows an example of the Comparative-adder C-adder 400 as a comparative 3-operand adder directed by its C3 Adder local instruction 460-3 to generate the scaled operands as in FIG. 5E to create the FP status 422 and the FP result 426 presented to its output selector 450, which may not only generate the output package 452 as in FIG. 5B, but may also generate a condition code 456 of one or more bits that may be used to stimulate one or more process state calculator 300 and affect the generation of one or more process indexes such as 302 and/or 304. The condition codes 456 may be queued and/or may be collected in parallel to create a condition code vector that may select one of multiple successor process index values. By way of example four of the comparative adders may be operated to determine a four bit vector that may then select one of 16 potential process indexes as the next of the process index 302.

Figure 5G:
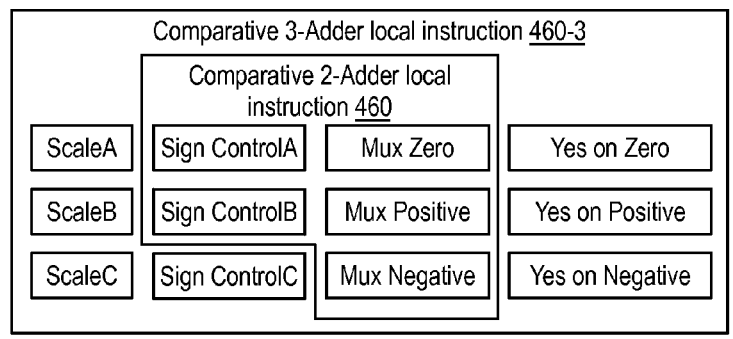

FIG. 5G shows an example field definition of the comparative 3 operand adder local instruction 460-3 of FIG. 5F as an extension of the comparative 2 operand adder local instruction 460 of FIG. 5C. While there is more that will be disclosed about the adders 400, the above discussion is sufficient to proceed with a discussion of the feedback paths.

A feedback path such as F0 may include an output Fout 0 organized as one or more queues that may stimulate the calculation of process indexes 302, 304 and/or the local instruction processing 312 as the data becomes available for use within the owning process PP or SP as will be discussed in FIG. 6A. Multiple queues in a single feedback F1 output port Fout are shown in FIG. 6B. Feedback paths with multiple input ports Fin 00 and Fin 01 and a shared output port are shown in FIG. 6C.

Figure 5H:
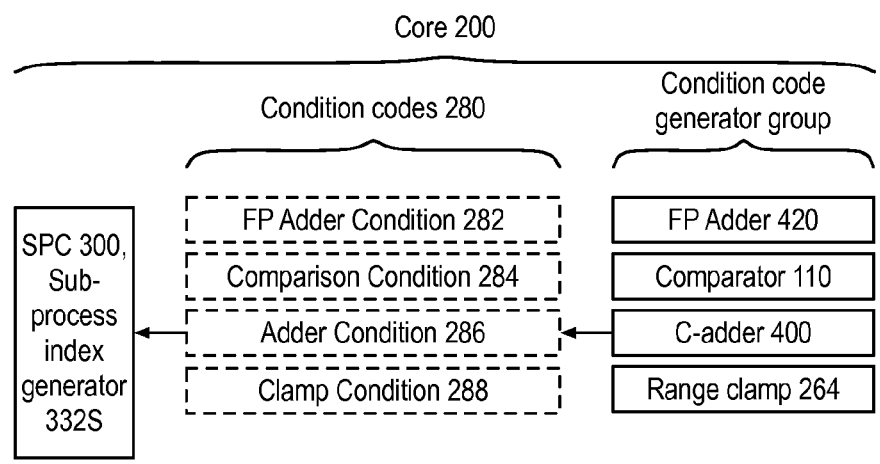
FIGS. 5H and 5I shows some details of condition code generation and range clamps.

FIG. 5H shows each of the members of the basic apparatus group (BAGM) may further comprise at least one instance of at least one member of a condition code generator group configured to create at least one condition code with the member of the basic apparatus group configured to respond to the condition code to at least partly create at least one of the process indexes, with the condition code generator group consisting of the FP adder, the FP comparator, the general comparator, the Memory processor, an adder and an range clamp.

Figure 5I:
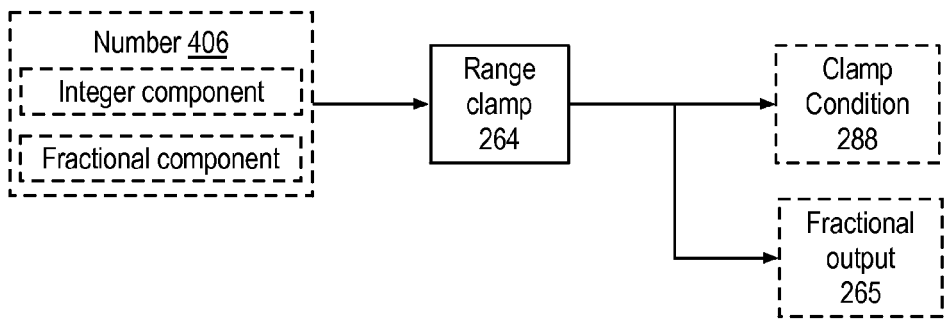

FIG. 5I shows the range clamp configured to receive a number representable as a integer component and a fractional component to create a fractional output based upon the fractional component and the condition code based upon a range limitation of the integer component. Such numbers include but are not limited to FP numbers.

The range clamp is a continuous throughput circuit generating the range limited input for periodic functions, as well as indicating which range approximation is to be used, possibly as a condition code. The Range clamp condition code may be presented to a process state calculator to affect the generation of a process index and/or it may be presented to an instruction zone generator to affect the instruction zone (these will be discussed shortly). It can also act as a standard clamp circuit as found in graphics accelerators that can return separate integer and fractional parts of a floating point number.

The inputs, stored states in the queue or queues may include not only a number but also an operand package 402 including an index list 410 as shown in FIG. 5A. The index list 410 may include an index 412 used to indicate real and imaginary components of a complex number, quaternion and so on. The index 412 may also indicate the row index of a column vector, a column index of a row vector, the row and column indexes of an entry in a matrix and so on. Also, the index 412 may be used to indicate a sub-process index 320, which will be discussed shortly.

Figure 6A:
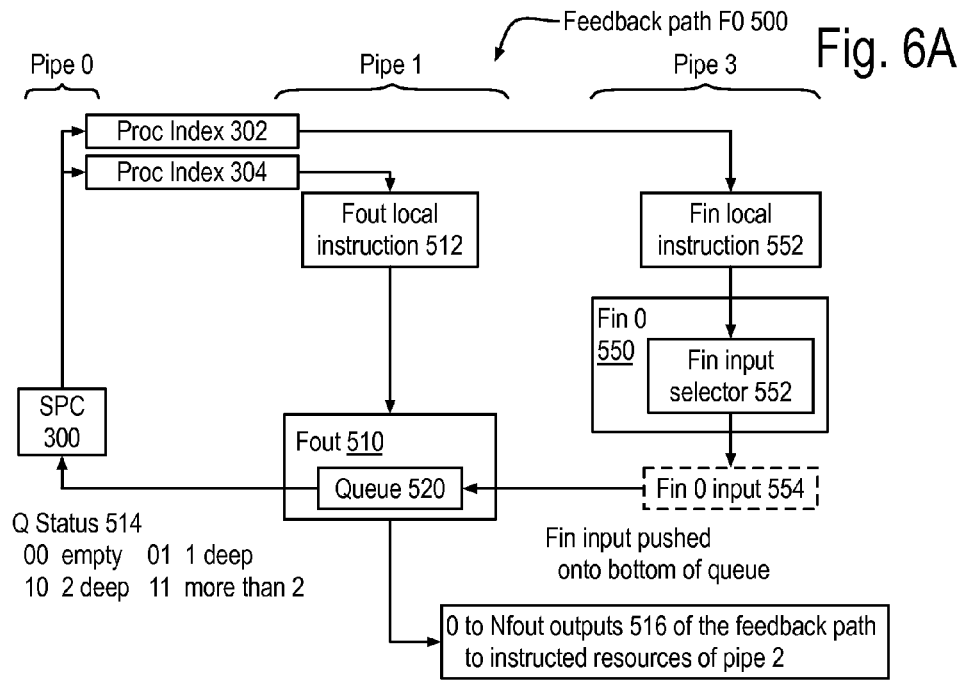
FIGS. 6A to 6C show some details of the internal feedback paths of FIG. 4 that are relevant for the external feedbacks.
Figure 6B:
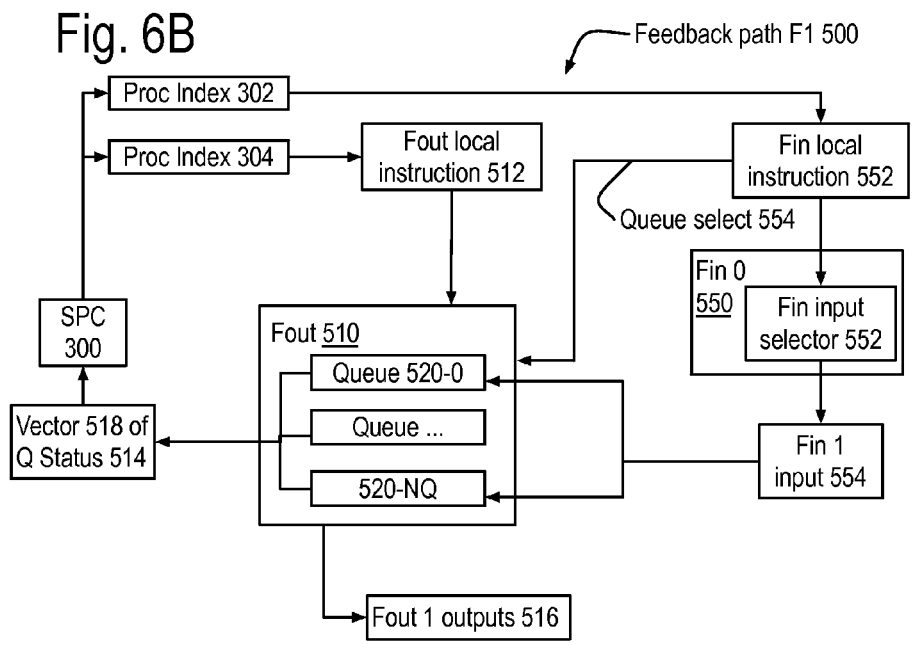
Figure 6C:
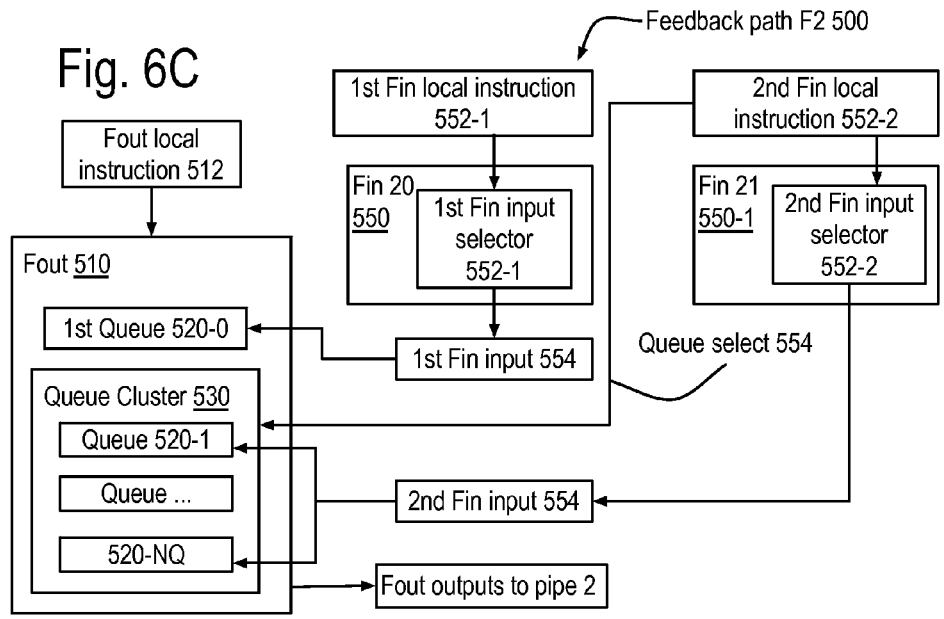

FIG. 6A shows a block diagram of an example implementation of a feedback path F0 with one feedback input port Fin 0 550 selecting an input based upon a Fin local instruction 552 in instruction pipe 3 to create Fin input 554, which is pushed onto the bottom of a queue 520 that is operated by a feedback output port Fout 510 based upon an Fout local instruction to generate at least one, and often two or more outputs 516 (0 to Nfout) in instruction pipe 1 for use in pipe 2.

The local instructions for Fin and Fout may each be generated based upon one of the process indexes traveling with the execution wave front 212 as in FIG. 4, from instruction pipe 0, where they originate from the Simultaneous Process state Calculator SPC 300, through instruction pipes 1, 2, 3 and so on. In the examples found throughout this document, the process ownership will vary from one process owning both the input and output ports of a feedback path to distinct processes owning them.

In this example, queue status 514 summarizes the internal condition of the queue 520 presented to the SPC 300. By way of example, a two bit code is shown, where 00 indicates the queue 520 is empty, 01 indicates the queue 520 is 1 deep, 10 indicating the queue 520 is two deep and 11 indicating that the queue 520 is at least three deep.

FIG. 6B shows a refinement of FIG. 6A with at least one of the feedback paths 500 operating more than one queue labeled 520-0 to 520-NQ, where NQ is at least one. The Fin local instruction 552 further includes a queue selection indicator 554 that directs the Fin input 554 to be pushed onto the bottom of the selected queue in response to the queue selection indicator 554. The Fout local instruction 512 further selects at least one of the queues 520-0 to 520-NQ to generate the Fout outputs 516 presented to instruction pipe 2 resources, which are not shown in this Figure. The queues 520-0 to 520-NQ may collectively present a vector 518 of the status 514 of the queues, where each of the queue status components may be represented by a small bit code possibly like that used in FIG. 6A.

FIG. 6C shows an example of a feedback path F2 with multiple input ports Fin 20 550 and Fin 21 550-1 and a shared output port Fout 510.

The first feedback input port Fin 20, 550 is driven by a first Fin local instruction 552-1 which may be similar to the local instruction 552 discussed above in FIG. 6A. The first feedback input port 550 generates a first Fin input 554 in response to the first local instruction 552-1, which is pushed onto the bottom of the first queue 520-0.

The second feedback input port Fin 21, 550-2 is driven by a second Fin local instruction 552-2 which may be similar to the local instruction 552 discussed above in FIG. 6B. The second feedback input port 550-1 generates a second Fin input 554 in response to the second local instruction 552-2, which is pushed onto the bottom of the queue 520-1 to 52-NQ possibly in response to a queue select 544 included in the second Fin local instruction 522-2.

Figure 7A:
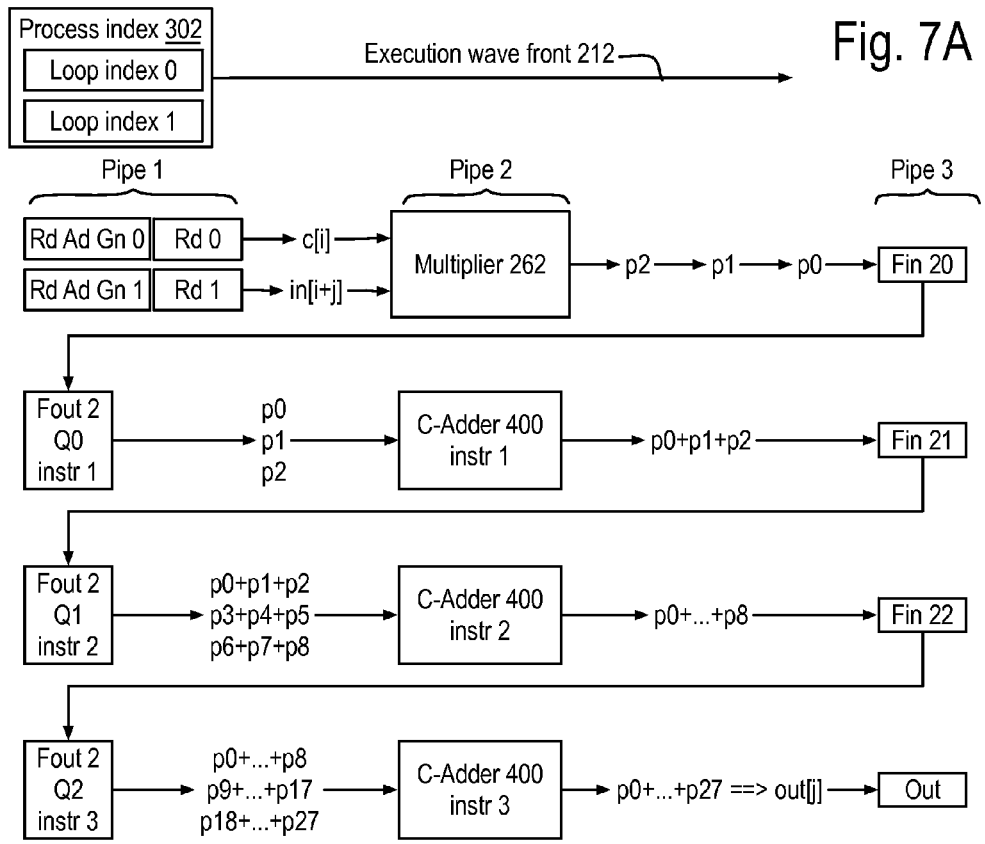

Data processing inevitably requires data memory to store partial results and/or inputs until they are needed. Making such memory reside in the core removes the need of data caching. Augmenting data memory with multi-queued feedbacks, and possibly queued (or multi-queued) inputs, further organizes and streamlines programming. Given the above discussion of the basic feedback path mechanisms, three examples now show the operation of these feedback paths with other components of the core 200:

FIG. 7A shows a FP filter implemented so that the multiplications do not stall, independent of core 200 clock frequency or the number of pipe stages in the arithmetic circuits, and the other circuitry keeps up with the multiplications, to provide maximum performance for a filter with 27 taps. The filter may be a Finite Impulse Response (FIR) filter The C-adder 400 is implemented as in FIGS. 5E and 5F to support additions of three operands.

Let c[0], c[1], ..., c[K-1] be the taps, or coefficients, and in[0], in[1], and so on be a sequence of input floating point numbers received by the filter and out[0], out[1] and so on be the sequence of output floating point numbers from the filter, then the following formula summarizes the relationship between the inputs and the outputs:

$$\text{Out}[j] = \sum_{i=0}^{K-1} \text{in}[i+j] * c[i]$$

To simplify this discussion, consider for the moment that the needs of buffer management are met without further discussion, in that those details would cloud the intended basic discussion. While omitted, it should be noted that this is a standard practice in digital signal processing and that a practitioner of ordinary skill in the art can derive such management mechanisms without undue experimentation. Also assume that K=27.

As shown in this example, one of the process indexes 302 may include two loop index outputs, labeled loop index 0 and loop index 1, which may be used by the read address generators 0 and 1 to generate the addresses used by the read ports 0 and 1 to retrieve the data, in this example, the floating point data $c[i]$ and $in[i+j]$.

This process index 302 need only be used by the top row of instructed resources, including the read address generator 0, the read port 0, the read address generator 1, the read port 1, the multiplier 262 and the F2 feedback input port Fin 20.

A second, simultaneously executing process may own all the resources and operations below that first row, the second feedback path output port Fout 2, the adder 400, the second F2 feedback input port Fin 21 and the output port. This process may be controlled by the second process index 304 and/or share control between the SPC 300 and the local instruction processors 322. The second process may be entirely configured to response to the availability of data in the Queues 0 to 2. These variations will be more fully explored after completing the next two walkthroughs of FIGS. 7B and 7C.

Figure 7B:
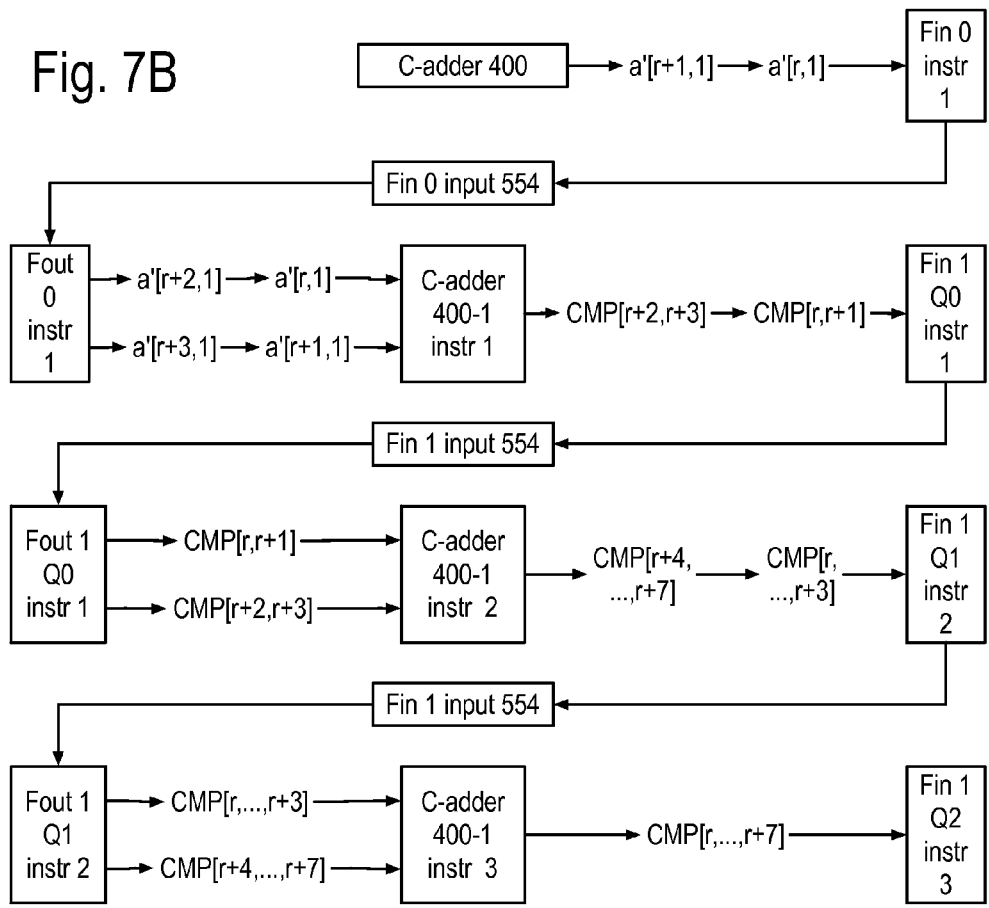

FIG. 7B shows both the feedback path F0 of FIG. 6A keeping up with the multiplier and feedback path F1 of FIG. 6B enabling a hierarchical response to data availability so that a single adder, for example C-adder 1, to act like a cascading adder network for accumulating the pivot entry calculation in matrix inversion.

In this example, C-adder 400 of FIG. 4 is generating first column of the next version of the augmented matrix, denoted as $a'[r,1]$, followed by $a'[r+1,1]$, and so on, which are selected as input by Fin 0 shown in FIG. 6A to provide the Fin 0 input 554 to Fout 0 and its single queue. Note that the C-adder 400 and the Fin 0 circuits may be operating every clock cycle to keep up with the multiplier, which is not shown. The local instruction for Fin 1 is a single instruction.

When Fout 0 has two or more entries in its queue, it outputs pairs, first $a'[r,1]$ and $a'[r+1,1]$ which are received by C-adder 400-1. C-adder 400-1 uses a first instruction to select these operand packages from Fout 0 and generates CMP[r,r+1], the resulting operand package from the $a'[r,1]$ and $a'[r+1,1]$. CMP[r,r+1] is sent as Fin 1 input 554 to Fout 1 queue 0. Note that there are enough outputs available in Fout 0 every two clock cycles to trigger this instruction 1. For example, two clock cycles later, $a'[r+2,1]$ and $a'[r+3,1]$ are sent from Fout 0 to the C-adder 400-1, which again executes instruction 1 to generate CMP[r+2,r+3].

When Fout 1 Queue 0 has two or more entries in its queue, it outputs pairs, first CMP[r,r+1] and CMP[r+2,r+3] which are received by C-adder 400-1. C-adder 400-1 uses a second instruction to select these operand packages from Fout 1 and generates CMP[r, . . . , r+3], the resulting operand package from the partial comparison results CMP[r,r+1] and CMP[r+2,r+3]. Note that there are enough outputs available every four clock cycles to trigger this instruction 1 in the Fout 1. For example, four clock cycles later, CMP[r+4,r+5] and CMP[r+6,r+7] are sent from Fout 1 Queue 0 to the C-adder 400-1, which again executes the second instruction to generate CMP [r+4, . . . , r+7].

When Fout 1 Queue 1 has two or more entries in its queue, it outputs pairs, first CMP[r, . . . , r+3] and CMP [r+4, . . . , r+7] which are received by C-adder 400-1. C-adder 400-1 uses a third instruction to select these operand packages from Fout 1 and generates CMP[r, . . . , r+7], the resulting operand package from the partial comparison. Note that there are enough outputs available every eight clock cycles to trigger this instruction 2 in the Fout 1.

FIG. 7C shows most of the components of the core 200 of FIG. 4 being used during row-adjustment of the Parallel Part PP to create the operand packages denoted as a'[row,column] sent via Feedback input port 0 to the Sequential Part SP simultaneously performed pivot calculations, with the availability of data for comparison being triggered by queue states as in FIG. 7B.

Instruction processing gets even better, the more distributed the control of the simultaneous processes, the fewer local instructions need to be issued. While the SPC 300 provides some very substantial savings in VLIW memory and removes the Sequential Part SP stalling the Parallel Part (PP) for matrix inversion, additional savings may be found in some implementations through the use of feedback queue status triggering data availability for what will be referred to as sub-processes as seen in the examples of FIGS. 7A to 7C.

FIGS. 8A, 8B and 8C show examples of that the sub-processes may be directed by one or more sub-process index 320 and so on to 334 that may be distributed in sub-process index fields of one of the process indexes 302.

This has lead us to realize that the instruction processing for these more refined simultaneous processes may be controlled based upon internal states in some or all local instruction processors 312 and data availability from a previous pipe stage, which will be discussed shortly.

Another very productive approach is to partition a process index such as 302 into sub-process index fields that may instruct subsets of the owned resources 316 essentially independent of other distinct subsets of resources 316.

While the overall scheme of FIG. 1 is sufficient to implement computers 100 that can perform matrix inversion at the rate of generating multiplications, these refinements can be useful in reducing instruction processing overhead.

FIG. 8A shows an example of the process index 302 including many sub process index fields, which may be allocated on a resource-by-resource basis, or on a resource-type basis.

The resource-by-resource basis includes the following sub-process index fields: an input process index 320, a multiplier process index 324, a Fin 0 process index 326, a Fout 0 process index 328, a C-adder 0 process index 330, a Fin 1 process index 332 and an output process index 334.

The resource-type basis includes the Rd ports process index 322 that may instruct all the owned Read ports of the data memories 240. Note that in many implementations, the read ports process index 322 may also be instructing the Read port index binders such as Rd Indx-bndr 0, and the read port address generators such as Rd Adr gen 0, as found in FIG. 4.

FIG. 8B shows another example of the process index 302 configured with two sub-process indexes 320 and 322, possibly to implement the process of FIG. 7A using the second feedback path F2 500 as shown in FIG. 6C.

Sub-process index 320 instructs the instructed resources shown in the first row of FIG. 7A, the Read ports such as Rd 0, Rd 1 and/or Rd 2, the multiplier 262, and the F2 first input port 550.

Sub-process index 322 instructed the instructed resources below the first Two in FIG. 7A, the feedback output port Fout 2 of the second feedback, C-adder (0) 400, the second input port Fin 21 550-1, and the output portal 224.

FIG. 8C shows a generic partitioning of the process index 302 into four sub-process indexes 320, 322, 324 and 326 that may be useful in the support of applications programming of the core 200 for a wide variety of algorithm implementations.

These fields in some embodiments may be of fixed size and in other embodiments may vary in size. In some embodiments, these fields may be as small as 1 bit and in others, may be two or more bits in size. An FPGA emulator implementation of the computer 100 may use a 6 bit sub-process index 320 to account for use of 6 bit look-up table configurations. A multi-tasking version of the computer 100 may use allocate such a 6 bit range on a task-by-task basis. These and many other variations are intended within the scope of the invention. The practitioner of computer design will recognize that such variations can be developed without undue experimentation based upon this disclosure. Consequently, this disclosure will continue without further discourse on these and other variations in the sub-process indexes.

Figure 9A:
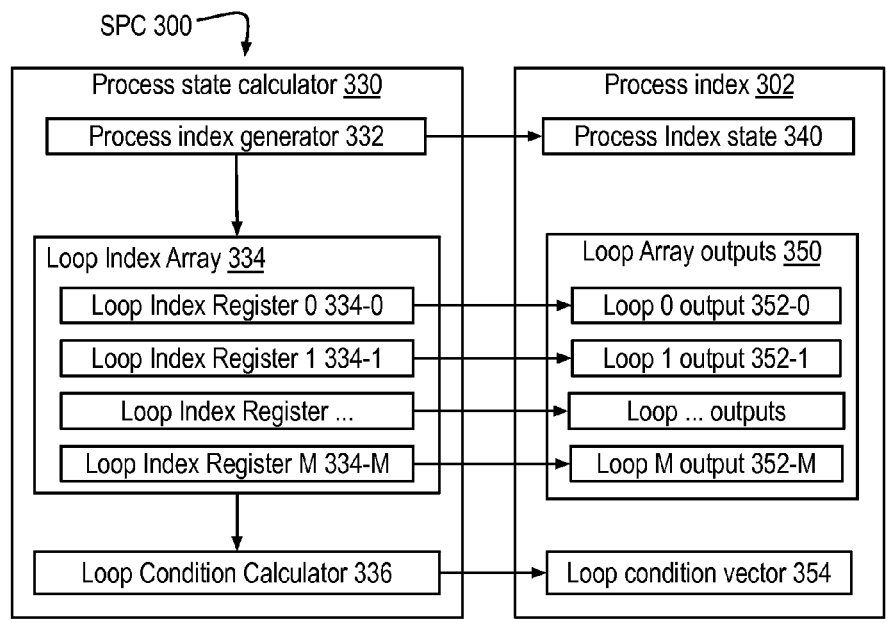
FIG. 9A shows some details of the simultaneous process state calculators.

FIG. 9A shows an example implementation of the simultaneous process state calculator (SPC) 300 including at least one process state calculators 300 that generate a process index 302. The process index 302 may include a process index state 340, a loop array outputs 350 and possibly a loop condition vector 354.

The process state calculator 330 may include a process index generator 332, a loop index array 334, and a loop condition calculator 336. The process index generator 332 may be configured to generate the process index state 340. The loop index array 334 that may include loop index registers 0 to M referenced as 334-0 to 334-M, where M is one or more. Each of the loop index registers, such as 334-0 may be configured to present a loop output such as 352-0. The loop condition calculator 336 configured to respond loop state information from the loop index register array to generate the loop condition vector 354.

The process index state 340 may be implemented as one or more of the sub-process index fields 320-334 of FIGS. 8A to 8C.

The loop array outputs 350 may be presented to the core 200 as part of the process index 302 to be sent as part of the execution wave front 212 as in FIG. 4.

The loop condition calculator 336 and the loop condition vector 354 may or may not be part of the core 200. In certain embodiments, the loop condition vector 354 may provide the programmer of these computers 100 and cores 200 with the ability to readily determine when a loop is starting, or when the loop is about to end, when the loop may be in come other condition, such as processing a particular sub-matrix.

Figure 9B:
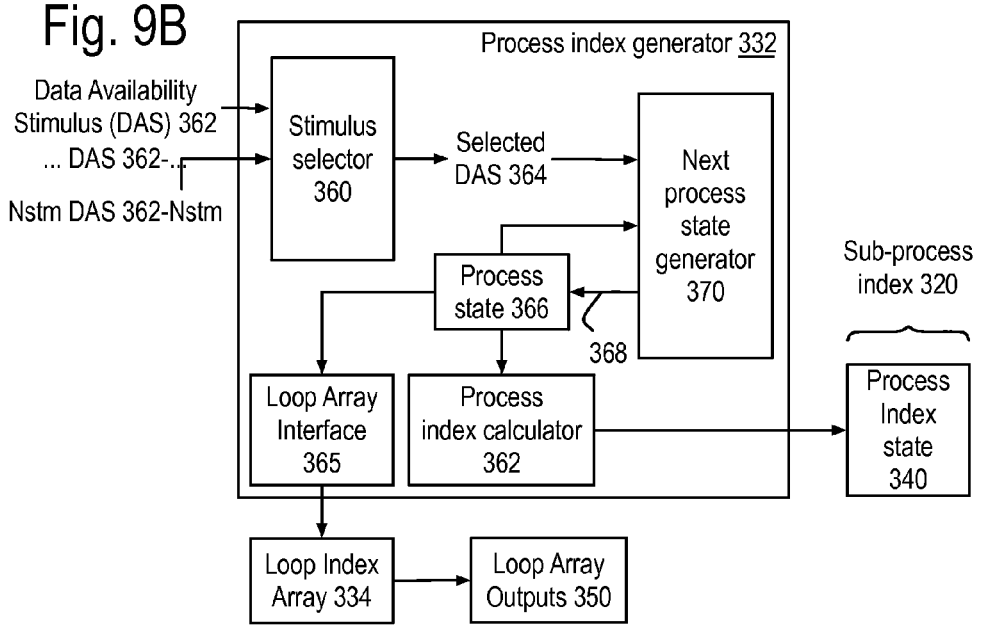
FIG. 9B shows some details of the process index generator of FIG. 9A.

FIG. 9B shows some details of an example implementation of the process index generator 332 of FIG. 9A.

The process index generator 332 may include a process state 366, a stimulus selector 360, a next process state generator 370, a process index calculator 362 and a loop array interface 365.

The stimulus selector 360 configured to respond to the Data Availability Stimulus (DAS) 362 to 362-Nstm to create at least one selected DAS 364 presented to a next process state generator 370.

The next process state generator 370 may be configured to respond to the process state 366 and the selected DAS 364 to generate the next process state 368.

The process state 366 may be distributed to the next process state generator 370, a process index calculator 362 and a loop array interface 365. The process state 366 may respond to the next process state 368, possibly on each clock cycle.

The loop array interface 365 may respond to the process state 366 by instructing the operation of the loop index array 334, which generates the loop array outputs 350.

The process index calculator 362 may respond to the process state 366 by creating the process index state 340.

Figure 9C:
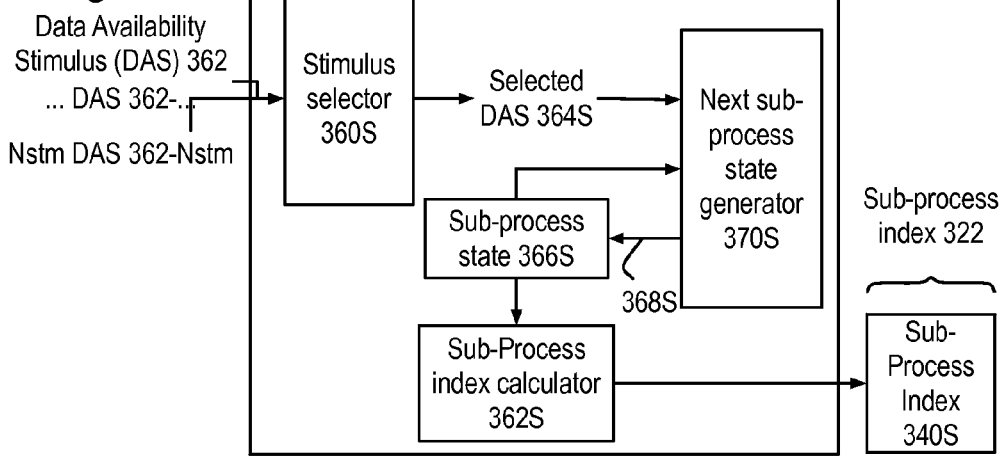
FIG. 9C shows some details of the sub-process index generator that are similar to the process index generator of FIG. 9B.

FIG. 9C shows some details of the sub-process index generator 332-S, which shares similar components to the process index generator 332, with the exception that in this example, there is no loop array interface 365 and no loop array outputs 350 are generated for the sub-process index 320.

The sub-process index generator 332-S may include a sub-process state 366S, a sub-process stimulus selector 360S, a next sub-process state generator 370S and a sub-process index calculator 362S. Each of these components functions similarly to their similar component in FIG. 9B.

Figure 9D:
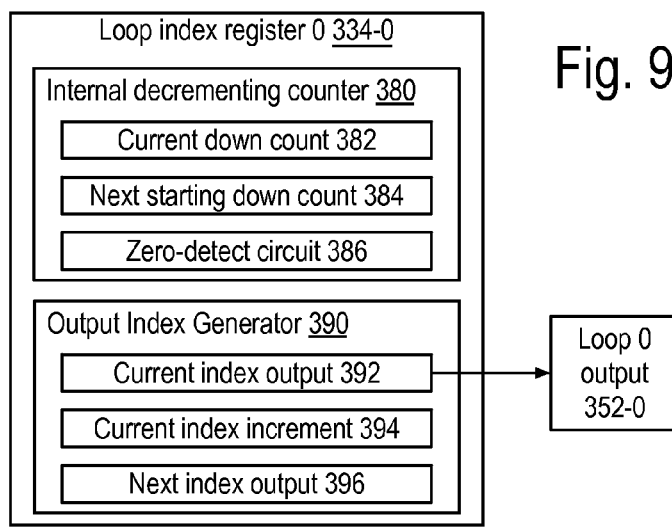
FIG. 9D shows some details of an example loop index generator as shown in FIG. 9A.

FIG. 9D shows some details of an example implementation of the loop index register 0 referenced as 334-0 of FIG. 9A, which is configured to generate the loop 0 output 352-0. The loop index register 334-0 includes an internal decrementing counter 380 and an output index generator 390.

The internal decrementing counter 380 may include a current down count 382, a next starting down count 384 and a zero-detection circuit 386 configured to receive the state of the current down count 382 and generate a zero-detect signal to indicate the end of the loop's iterations. At the end of the iterations, typically on the next clock cycle, the current down counter 382 is set to the next starting down count 384. On successive clock cycles, the current down count 382 is decremented to create the next value for the current down count 382.

The output index generator 390 may include a current index output 392, a current index increment 394, and a next index output 396. The current index output 392 may be configured to generate the loop 0 output 352-0 of FIG. 9A. The current index increment 394 may be added to the current index output 392 to create the next index output 396. On the next clock cycle, the next index output 396 may become the current index output 392.

Figure 9E:
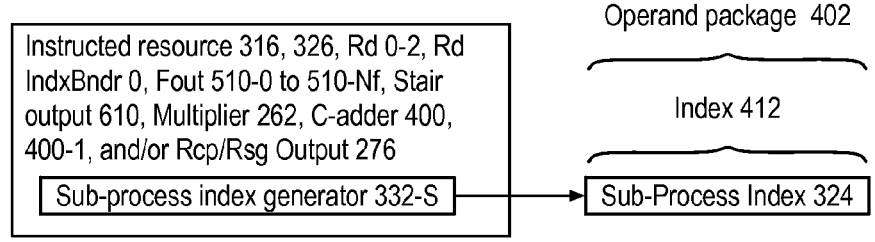
FIG. 9E shows some examples of instructed resources that may include the sub-process index generator of FIG. 9C that may further generate a sub-process index included in an operand package of FIG. 5A.

FIG. 9E shows that for example, any instructed resource 316 and/or 326 may include a sub-process index generator 322-S that may be configured to create the sub-process index 324 that may be included as one of the indexes 412 in an operand package 402. The sub-process index 324 may be the only index 412 in some situations.

FIG. 9F shows a local instruction processor may include a local instruction address generated in response to the local process index. The local instruction address is used to access a local instruction memory to at least partly create the local instruction instructing a local resource.

The local resource may include, but is not limited to, a multiplication generator such as a multiplier, a log calculator, a log ALU and/or an exponential calculator, as well as, an FP adder, an FP comparator, a reciprocal calculator that may be able to also generate a reciprocal square root, possibly with separately instructed input and output ports, as well as the access ports of a data memory configured to read or write the data memory, and possibly including address generators and index list binders, as well as queues that may be included in internal feedback paths, external feedback paths between cores and/or PEM, or included in output or input ports of one of the above local resources, or included in the write port to queue addressing and index lists for delayed writing of data provided by an external feedback network.

FIG. 9G shows the local instruction processor may further include a local instruction address generator responding at least in part of the local process index to create the local instruction address used to access the local instruction memory to create a local macro instruction presented to a local macro processor to create the local instruction.

Here are some examples of the operation of the local macro processor:
- It may be to suppress an operand presented to a comparative adder if its index list indicates that it is from a row above the diagonal row and therefore off limits for comparisons to generate the next pivot entry.
- It may be used to select a possible input as the operand for an FP Adder or multiplication generator based upon a data valid indication in the index list.
- It may be used to select a possible input as the operand for an FP Adder or multiplication generator based upon an indication in the index list that it is an imaginary number. In other situations the selection may occur if the indication is that it is a real number.

Examples of local instruction address generation that may respond to more than just the local process index may be implementations supporting multi-tasking by responding to a task identifier and/or implementations responding to the selected data of the local resource, such as an indication of whether a number represents a real or imaginary component of a complex number, or to an indication of its entry index(es) in a matrix, such as its row and/or column indexes.

FIG. 9H shows another example of the computer 100 including a second core 202 including a multiplication generator 102 that includes an exponential calculator configured as an exponential calculator input port configured to receive a log-result and an exponential output configured to provide with the multiplication in response to the log-based result.

FIG. 9H also shows non-additive calculations being performed by a Logarithm calculator (Log), a Floating Point to Log converter (FP2L), a Log-based Adder (Log Add), log-based multiplier (LgMul), an exponential calculator with separate input and output ports (Exp-in and Exp-out) and a Log to Floating Point converter with separate input and output ports (L2FP-in and L2FP-out).

Multiplication is primarily effected by the Log Add performing a log-domain add operation on two or more log-format operands to create a log-result that is received by the Exp calculator which generated the multiplication.

These log-based calculators have been developed as models in VHDL and C with confirmed precision supporting mantissa inputs to the log calculator of 24 bits, internal log value precision of $>=24+\log_2(24) \approx 28.585$ bits. This enables the log Add to perform shifted additions of up to $24*\log\_value=24*\log_2(x)$, which result in the exponential calculator outputting up to $x^{24}$, which is accurate to within ½ LSB of the standard single precision floating point mantissa of 23 bits.

Based upon the precision of these circuits and their pipelined architecture a range limited approximation for cosine requires 4 non-linear terms to be accurate to within 1 LSB, so that this core can generate a range limited cosine every four clock cycles for single precision floating point.

There are several common elements between FIG. 4 and FIG. 9H. Each including a process state calculator module including a first process calculator and a second process calculator (Proc Calc 0 and 1), dual comparison capable floating point adders (C-Adder0 and C-Adder1), three or more internal feedback paths (F0, ... , FNf), instances of single ported data RAMs, an input port, an output port, one each of external feedback input and output portals (Stairway In and Stairway Out) to at least one external feedback path and feed forward circuits (Pass). The feedback paths may each include at least one queue that provides a straightforward mechanism for the synchronization of operations based upon the availability of data in these queues that will be shown and discussed shortly.

These cores operate based upon an execution wave front that consistently passes from the first instruction pipe (Pipe 0) to successive instruction pipes ending with Pipe 3. The process calculators operate first to generate the process indexes, which are then used by the read address generators and input port to create their local instructions in Pipe 1 and then are transmitted slightly ahead of the data to the successive pipe stages for selection by their instructed resources for their local instruction generation.

The core 200 may be extended to multi-core modules. FIG. 10 shows the computer 100 may include a Program Execution Module (PEM) 500 further including a small number of instances of the core 200 integrated into with matching instruction pipes 0, 1 and so on. This example shows four instances of the core 200, but various implementations of the PEM 500 may include two or more. The inputs of each instructed resource 312 and 322 of each core 200 may select from outputs of the instructed resources of the previous instruction pipe from any of the cores.

This allows the internal feedback paths F0, ... , FNf, which are instructed resources of each core 200 to seamlessly extend to serve as feedback among a small number of instances with essentially no change to latency.

Each instructed resource may select a process index 302-0 to 302-3 and 304-0 to 304-3 from any of the cores. For example, in instance 1 of the core 200, labeled 200-1, instructed resource 312-1 may select process index 302-2 and the instructed resource 322-1 may select the process index 302-0. So if one core 200 supports two simultaneous processes and a PEM 500 includes four cores 200, up to eight simultaneous processes may execute. The data availability stimulus 362 used to calculate each process index 302 may be extended to support response to any of the cores 200 the their data availability for their internal feedback, external feedback and/or input portal.

Computer architectures typically need to identify what instruction will execute next. FIG. 10 introduces two new tools, the instruction zone (IZ) that may coordinate the simultaneous processes by indicating which zone of instructions is to be executed by the simultaneous processes and a task identifier (TaskID) that may configure the selection of the instruction zone.

An algorithm can be partitioned into instruction zones. For example, matrix inversion can be partitioned into three instruction zones, the first performing an input-output of matrices, initialization of the augmented matrix and the calculation of the first pivot. The second calculates the scaling vector. And the third performs row-adjustment and the calculation of the next pivot.

Each core 200 selects from the presented range of instruction zones IZ 0, IZ 1, and so on, to create a selected instruction zone (SIZ) used for its process index calculations, so that separate cores may be configured to be part of separate Program Execution Units (PEU). The use of the Task ID to control selection 510-0 to 510-3, allows the very rapid reconfiguration of instruction zone distribution on a task by task basis. So that from one task to another, the hardware of the computer 100 may be configured as an SIMD and a MIMD architecture. Each of these PEU support execution of multiple simultaneous processes, so that however configured, multiple processes can simultaneously execute.

One PEU may execute on a Core 200 as a Single Instruction stream Single Data stream (SISD).

Figure 11A:
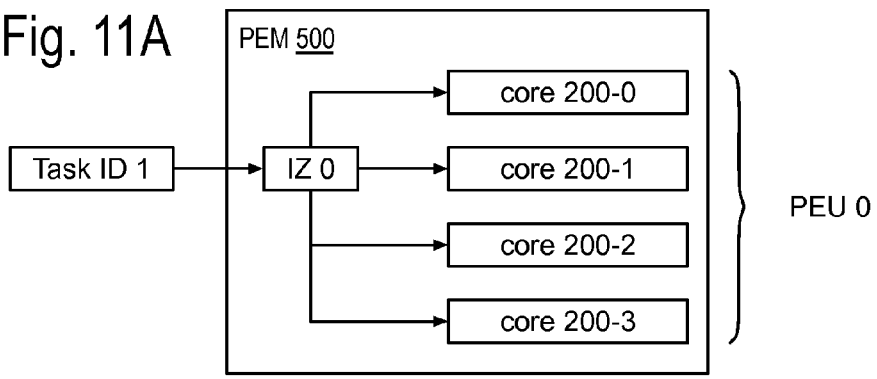
FIGS. 11A and 11B show the PEM of FIG. 10 in a SIMD (Single Instruction Multiple Data stream) configuration for a first Task ID and a MIMD (Multiple Instruction Multiple data stream) configuration for a second task ID, respectively.

FIG. 11A shows another PEU may execute on the multiple cores as a SIMD.

Figure 11B:
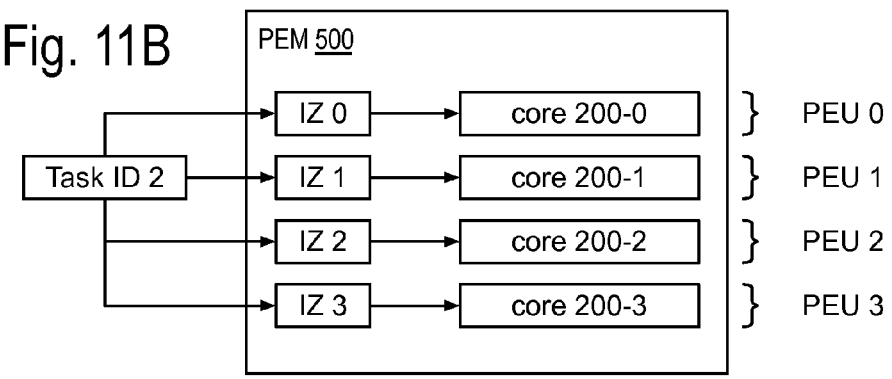

FIG. 11B shows a third configuration of the PEM 500 may execute as MIMD.

FIGS. 11A and 11B also show distinct task indicator values Task ID 1 and Task ID 2 that support configuring the PEM 500 and the cores 200 for specific tasks in the execution wave front 212.

The core 200 may be extended to multi-core chips 700.

Figure 12:
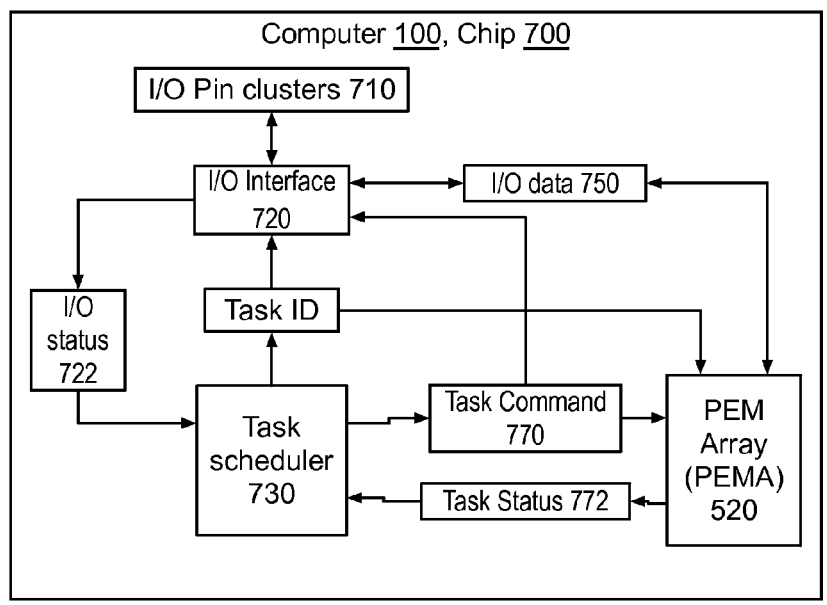
FIG. 12 shows the computer including a chip that includes a PEM array (PEMA), I/O interface, a task scheduler configured to generate the Task ID.

FIG. 12 shows the computer 100 including a chip 700 that insures the multiplications do not stall and the rest of the circuitry keep up. The chip 700 includes at least one Input/Output (I/O) pin cluster 610, an I/O interface 620, a Task scheduler 630 and a PEM Array (PEMA) 520 including at least one and often more PEM 500. Task scheduling may support task switching in a single clock cycle so that the multiplications 106 do not stall. In some embodiments, the tasks may requires some number of cycles to initialize the transition to the next task to execute, but preferably, the initializations for task switching does not stall the multiplications 106.

Figure 13:
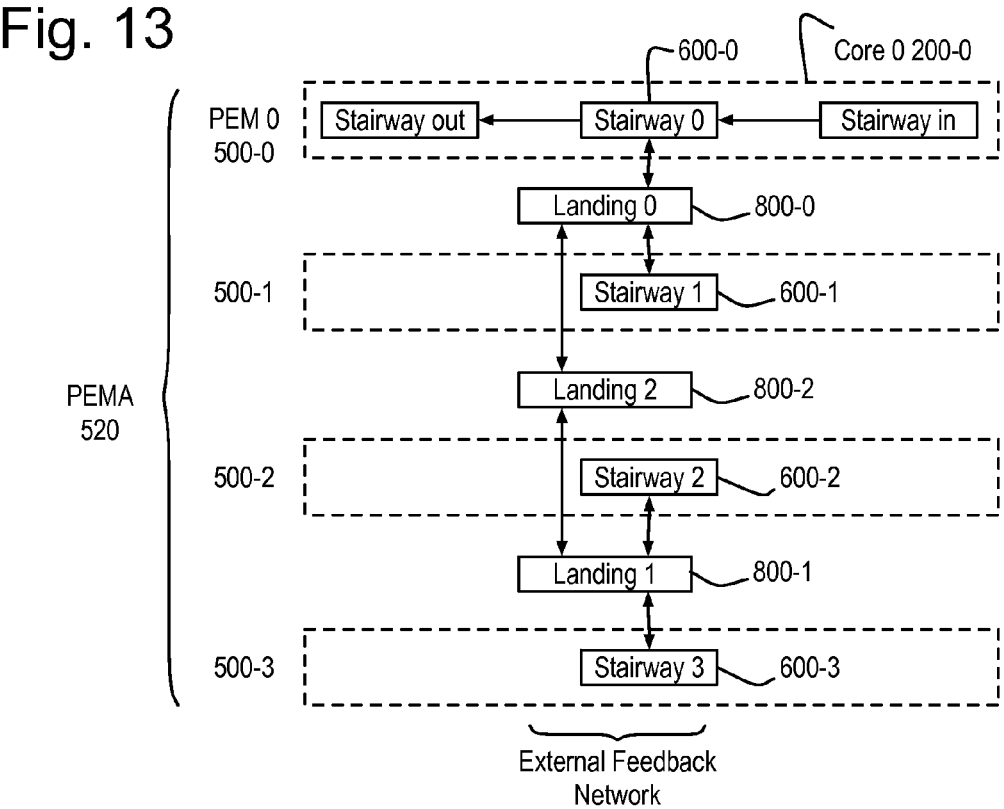
FIGS. 13 and 14 show an example of an external feedback network coupling to stairway in each of the PEM of the PEMA of FIG. 12. The external feedback network forms a bidrectional binary tree whose leafs are the Stairway input and output ports.
Figure 14:
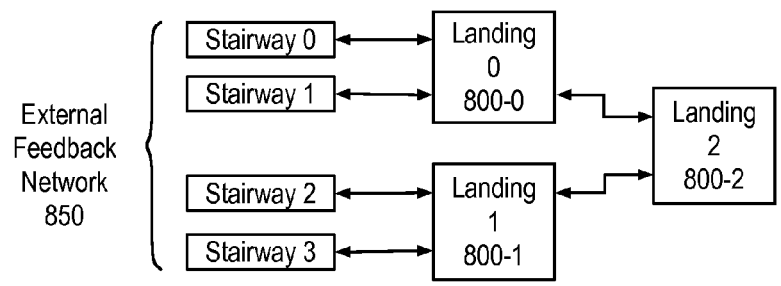

FIG. 13 shows an example of the PEMA 520 of FIG. 12 including four instances of the PEM with one of the stairways being used in an instance of the core 200, for example 200-0 of each of the PEM 500-0 to 500-3 in the PEMA 520. The feedback networks 850 between PEMs 500 traverse a more substantial distance in these arrays. To do this, they form a binary tree that has its roots in a core in each of the PEMs 500 as shown in FIGS. 13 and 14. The input and output ports of the network in the core are called a stairway 600. The feedback communication can continuously enter the binary tree from the stairway input port 650. At each intermediate node (known as a landing L) the inputs from the lower level traverse either up the tree or across the landing L in such a way that traversing across the landing takes as long as traversing up to the top of the tree and back down to the landing, leading at the lowest level to at least one queue in the output port 610 of the stairway. The continuous bidirectional binary tree provides a fixed latency and continuous throughput for global feedback within the chip 700. By taking 1 clock cycle to traverse through each landing going up or coming down, it takes 2N+2 clock cycles to traverse $2^N$ PEM instances.

The stairway inputs generate a traversal command to the feedback network for each feedback input package. The package includes data and an index list to support accumulation of the pivot comparisons across the PEM instances. The traversal command directs the feedback network during row adjustment to swap rows stored in different PEMs 500 when the pivot row and the diagonal row differ. Feedback operations for accumulation of pivot results are also supported.

Returning to FIG. 9, the task scheduler is a separate hardware component that identifies a task to run (Task ID) and transmits a task command vector for the identified task to each PEM and its cores. The task scheduler by construction cannot slow down the multiplications or the rest of the circuitry that needs to respond them. Upon receiving the task command vector, each of the cores simultaneously select the instruction zone based upon the identified task. Once the selected instruction zone has been generated, the core begins its execution wave front by calculating the process indexes based upon the task identified for execution, its component of the task command vector and the selected instruction zone. After calculating the process indexes, the execution wave front proceeds through the other instruction pipes as described earlier.

Different PEMs 500 may include fundamentally different cores whose instruction pipes do not need to align with each other, because the execution wave fronts need only start at the same time. All feedback between the PEMs 500 is through the stairways and landings, which insulate their cores from the core structure of the other PEMs 500.

The communication networks within the PEMA 520 are very similar to the feedback networks just described, using binary trees with similar communication landing nodes. The key difference is that the traversal commands may further indicate a target task as well as tree traversal directions.

Extending the Chips 700 to Multi-Chip Program Execution Systems (PES) 900

Figure 15:
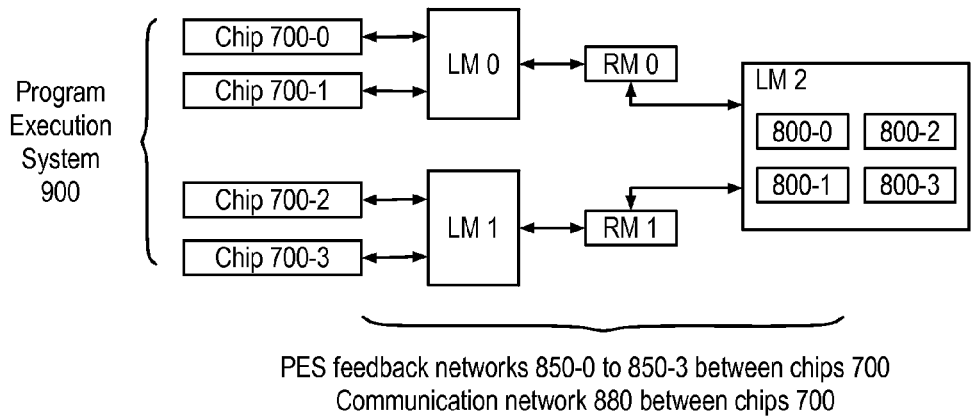
FIG. 15 shows a multi-chip system including chips with an additional pin cluster committed to feedback distribution using landing modules including a landing for each of the supported external feedback networks, which may be one, two, three or four in number. Note that the communication network has a very similar configuration, possibly only differing in that the communication network passes operand packages that include a designation of the destination task as well as destination core.

Chips 700 used in such PES systems 900 can have the external feedback networks 850 brought out to the pins and the binary trees extended through the used of Landing Modules (LM) as shown in FIG. 15. By way of example, the chips 700 may support four external feedback networks 850-0 to 850-3. The communication network 880 may have a similar bidirectional binary tree, with possibly as many communication networks as feedback networks 880-0 to 880-3. Feedback and possibly I/O networks face the challenge of long wire lengths which may act as antennas. This challenge is answered by installing repeater modules (RM) that act to keep wire lengths within constraints that limit antenna activity. The disclosed repeaters RM add to the latency of the networks 880 and/or 850, but they provide fixed latency and continuous bidirectional throughput.

Figure 16:
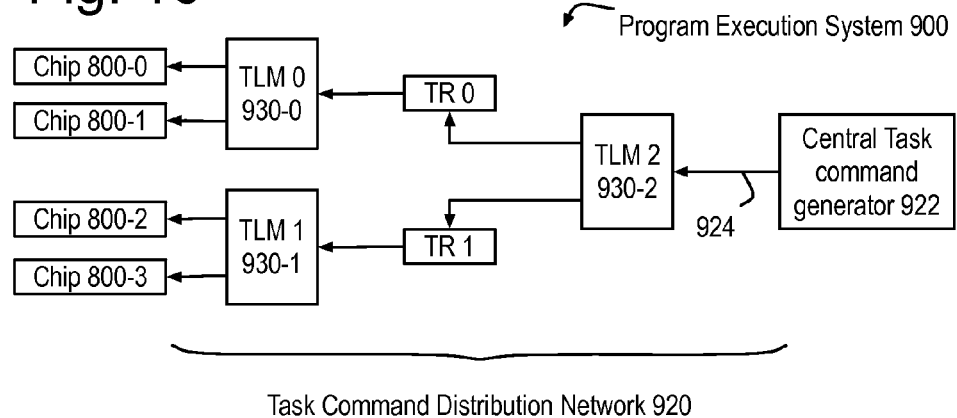
FIG. 16 shows the program execution system of FIG. 15 with a task command distribution network driven by a system level task command generator.

FIG. 16 shows a task command distribution network 920 providing synchronized, fixed latency distribution of a task command across the chips 700 in the PES 900. A central task command generator 922 coordinates the PES 900 acting on a single task at essentially the same time. The Landing Modules (LM) of FIG. 15 may be augmented to form the Task Landing Modules (TLM) that distribute the task commands traveling from the right to the left and may also integrate task status traveling from the left to the right, which has not been shown to simplify the figure. The Task command Repeaters (TR) act to keep wire lengths within constraints that limit antenna activity.

Certain of the chips 700 also support external memory interfaces that can be used for frame buffers and similar data structures. And again, the multiplications 106 are not stalled and all the other circuitry 104 keeps up.

Software Support for the Family of Computers 100

Many companies that have provided multi-processor systems have gone broke because the software community of their time was unwilling to leave the sequential programming paradigm. While the truth of the past is without question, there are several facts that have changed.

The main stream of computing has admitted that building faster single cores has come to an end.

Several development communities are ready to use these devices. The real-time DSP and control system communities are quite familiar with multi-processor and multi-core systems. The developers using programmable logic have developed high-speed state machines since the early 1980's. The real-time DSP community has championed merged systems mixing processors and programmable logic.

QSigma's approach extends many concepts already in use in the industry for which there are experts who need little added training to make use of our technology.

QSigma provides new tools that greatly simplify and/or optimize some tricky issues in today's real-time software environment.

Summary of how existing concepts operate and/or are extended within QSigma's architectural portfolio:

Programming any level of integration involves simultaneous processes. QSigma extends the existing concept of concurrent processes by demanding that each process be able to execute simultaneously upon instructed resources that it owns.

Real time control systems often use queue status to trigger interrupts or Finite State Machines. QSigma uses the queue status to trigger changes in local instruction processing at instructed resources, with much lower latency than existing interrupt structures typically provide. QSigma extends what finite state machines can do to high speed floating point data processing driven by programmed instructions.

QSigma's data memory allocations are static within each task, minimizing the possibility of run-time collisions. Compile-time and linkage edit stage testing can insure that the memory references are consistent.

QSigma provides some new tools that greatly simplify and/or optimize today's real-time software environment:

The adders have been extended to support chained comparisons without recourse to branching of any kind. This makes calculating the pivot in matrix inversion into a sequence of adder operations with feedback to accumulate the partial comparison results. Finding maximums or minimums can also become sequences of similar adder operations with feedback driven accumulation.

The adders have also been extended to receive more than two operands and to perform multiplications by small powers of two on these operands to prepare them for input to the multi-operand adder. By doing this, the performance of Discrete Wavelet Filters is greatly enhanced, because otherwise those multiplications would clog the multipliers.

With matrix inversion optimized, the method of least squares can be applied to many real-time signal processing problems such as sector estimation in a digital beam forming subsystem for radio receivers in base stations, or Wireless LAN access points.

Multi-way branching based upon multiple arithmetic comparisons can be executed with essentially no branching overhead.

The Range clamp performs range limiting decisions and input adjustments for periodic functions like sine and cosine use and extend the multi-way branching mechanism, again with no branching overhead.

QSigma has optimized logarithm and exponential calculations to support full single precision calculation of functions up to $X^{24}$.

This allows the range limited polynomial evaluation of sine and cosine to require half as many multiplications as a multiplier-based core.

These log based multiplication generators can generate $log_e X$ and $e^x$ in one step, whereas multipliers would take many steps to achieve the same results.

QSigma's programming paradigm extends in a consistent fashion from a single core, to multiple cores in a PEM, to multiple PEM in a PEMA, and to multi-chip PES providing easy vertical integration of programs.

Multi-tasking is supported by a separate task scheduler that seamlessly extends to multi-chip task scheduling.

There is no task swapping time overhead and all data processing, feedback and communication activities are task synchronized in the hardware.

Run-time testing for out of bound accesses to arrays can be economically implemented without disrupting the execution wave front.

Software tools for systems applications development will need to be developed. Such tools will be based upon a finalized instruction level specification for the initial products. QSigma has developed tools that can aid in controlling the time to market for developer tools for early adapters that can fit into follow-on tool development to support widening the market audience.

Figure 17:
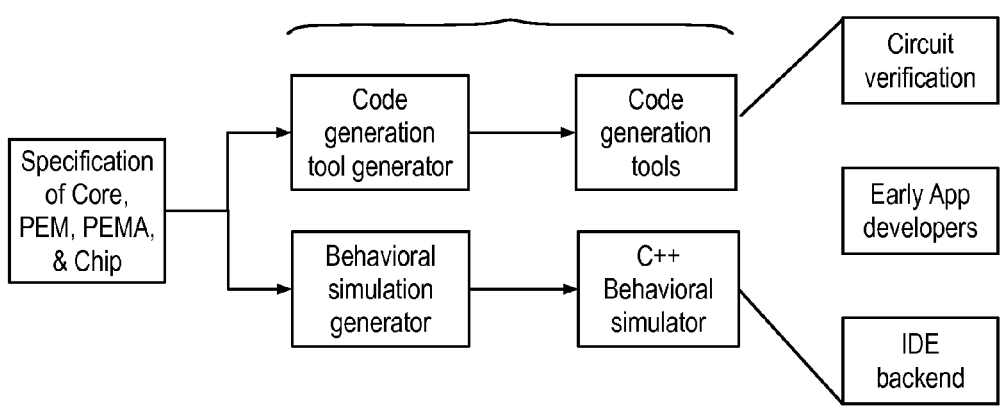
FIG. 17 shows a basic flow of initial software tools for the computer and its components.

FIG. 17 shows some backend code generation tools and automated simulation generators that can be driven by specification files compatible with Gnu C and Unix-style command line make and build scripts.

As the chips 700 and cores 200 are being developed, such tools support verification.

For the earliest of adapters, these tools support developing the first applications.

As an Integrated Development Environment (IDE) evolves, these tools become the backend for code generation, simulation and an interface to debugging the products as they are released.

Historically, one of the biggest problems in controlling time-to-market for systems products is debugging the application programs. To that end, there are several innovations that QSigma has made to optimize this often painful part of getting to market:

The flat time execution model greatly reduces what a programmer needs watch to debug a Program Execution Unit (PEU) and the task it belongs to.

The selected inputs, the operands formed from the selected inputs and the outputs of the instructed resources are all that need to be displayed. This is a fraction of the complexity of a typical debugging environment displaying each internal pipe stage, By organizing the debugger to show each simultaneous process and the execution wave front affecting its owned resources in the flat time model, the programmer can see just what is affecting the process and how it responds.

Through automatic task synchronization at every level, two tasks can only affect each other across the communication networks. The debugging environment for one task often need only concern itself with communication stimulus and response from test files.

The feedback and communication networks may be viewed in three ways: (1) what is entering and what is queued to leave the stairways, (2) what is at the inputs and outputs of each landing, and (3) the internal state of the landings.

Simplified task scheduling simulation can collapse the complexity of a multi-task, multi-chip PES to consider only what is being communicated and what the schedule allocations need to be for the PES to fulfill the demands placed on it and the workloads required.

Figure 18A:
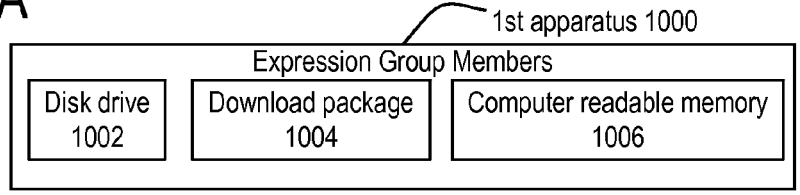
FIGS. 18A and 18B show some details of a first apparatus that may reside in a disk drive, a download package and/or a computer readable memory. The first apparatus may include a specification, a simulation, a product of the simulation, a netlist and/or a layout component of at least part of the computer.
Figure 18B:
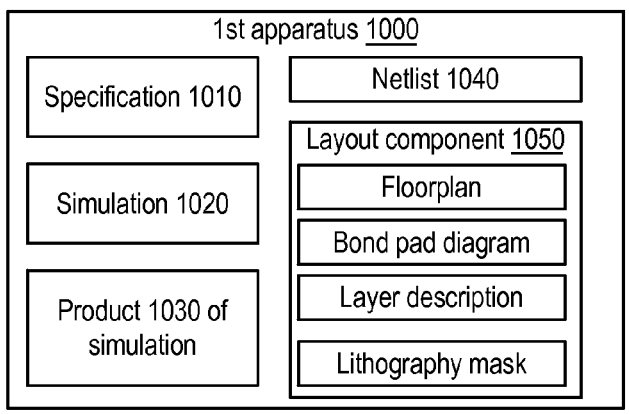
Figure 19:
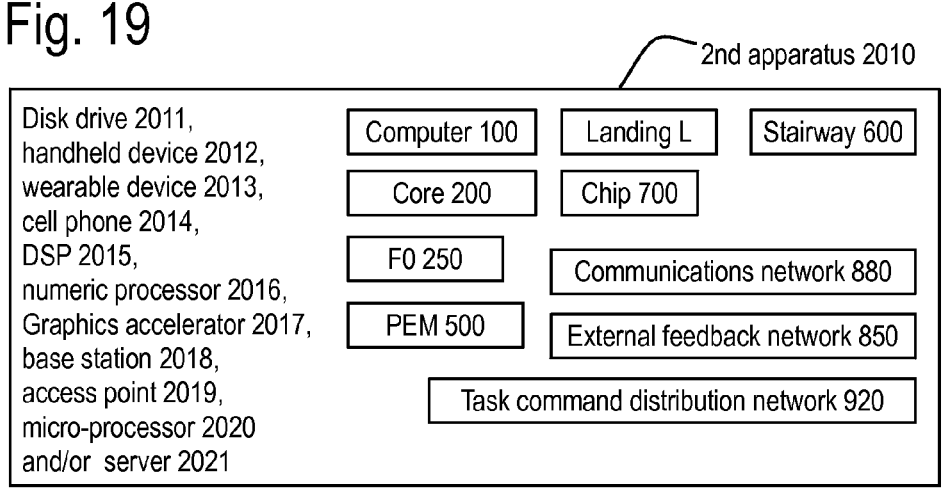
FIG. 19 shows a second apparatus including the computer and/or at least part of the computer. The second apparatus implement a disk drive, a handheld device, a wearable device, a cellular phone, a DSP, a numeric processor, a graphics accelerator, a base station, an access point, a micro-processor and/or a server.

There are two further embodiments of apparatus to disclose as shown in FIG. 18A to 19.

A first apparatus includes at least one member of an expression group including a disk drive, a download package and a computer readable memory that contain a specification, a simulation, a product of the simulation, a netlist and/or a layout component of at least part of the computer 100.

FIG. 18A shows a first apparatus 1000 that may include one or more of the members of the expression group consisting of a disk drive 1002, a download package 1004, and a computer readable memory 1006. FIG. 18B shows the first apparatus 1000 may including at least one of a specification 1010, a simulation 1020, a product 1030 of the simulation, a netlist 1040, and a layout component 1050, such as a floorplan, a bond pad diagram, a layer description and/or a lithography mask.

FIG. 19 shows examples of a second apparatus 2010 that may include the computer 100, or at least part of the computer 100.

The computer 100 and/or at least part of the computer 100 may be included in at least one of a disk drive 2011, a handheld device 2012, a wearable device 2013, a cellular phone 2014, a digital signal processor (DSP) 2015, a numeric processor 2016, a graphics accelerator 2017, a base station 2018, an access point 2019, a micro-processor 2020 and/or a server 2021.

By way of example, the computer 100 and/or the part of the computer may be an embodiment of the chip 700, the core 200, the PEM 500, the stairway 600, the landing L, the feedback path 250, and/or the external feedback network 850 and/or the task command distribution network 920 and/or the communication network 880.

Also, the core 200 and/or the chip 700 and/or the PEM 500 may be configured to support single precision FP and/or to support double precision FP. As used herein, single precision FP will include numeric formats with an exponent and mantissa ranging in length from 16 to 48 bits. Double precision FP will include such numeric formats ranging in length above 48 bits.

The preceding embodiments provide examples of the invention and are not meant to constrain the scope of the following claims.

The invention claimed is:

1. A computer, comprising: at least one multiplication generator configured to create a multiplication; and
at least one other circuit configured to respond to said multiplication,
with said computer configured to implement an Amdahl-compliant algorithm and stall said multiplication less than NMult percent with said other circuit keeping up with said multiplication, with said NMult less than ten, and
with said Amdahl-compliant algorithm configured on conventional computers to include a parallel part and a sequential part.

2. The computer of claim 1, further comprising a core comprising a Simultaneous Process state Calculator (SPC) configured to generate at least two process indexes; and
at least two instructed resources, each simultaneously instructed by a local instruction generated based upon one of said process indexes,
with said multiplication generator as one of said instructed resources.

3. The computer of claim 2, further comprising at least one condition code based upon at least one arithmetic operation creating a multi-way condition to direct said SPC to alter at least one of said process indexes across greater than three index values.

4. The computer of claim 3, further comprising a range clamp configured to receive an input number to create a range limited input and a range determination as said condition code.

5. The computer of claim 2, further comprising at least two instruction zone indications configured to be received by an instruction zone selector to create a selected instruction zone presented to said SPC to direct generation of said process indexes as part of a Program Execution Unit (PEU).

6. The computer of claim 5, further comprising a task indication (Task ID) configured to be received by said instruction zone selector to create said selected instruction zone as said part of said PEU for a task indicated by said Task ID.

7. The computer of claim 2, further comprising at least one instance of a data memory capable of providing at least one input to at least one of said instructed resources, said multiplication generator and/or said other circuit.

8. The computer of claim 1, further comprising at least one comparator configured to receive at least two operand packages to create a resultant operand package based upon the status of an arithmetic result generated within the comparator, with each of the operand packages including
at least one data configured for use as an operand to create said arithmetic result and
an index list containing at least one index.

9. The computer of claim 8, comprising an instructed resource configured to respond to a process index contained in said index list in at least one of said operand packages and/or said resultant operand package.

10. The computer of claim 9, comprising another of said instructed resource configured to create said process index in said index list.

11. The computer of claim 1, further comprising at least one queue configured to provide data availability stimulus through its queue status, with said data availability contributing at least part of an output of one of a feed forward, an internal feedback, an external feedback, an input portal and another instructed resource.

12. The computer of claim 11, wherein said internal feedback is within said core;
wherein said external feedback is between a first instance of said core and a second instance of said core through a landing bidirectionally communicating with an feedback input portal in each of said instances of said cores and a feedback output portal containing said queue in each of said instances of said cores; and
wherein at least one of said feed forward, said internal feedback, said external feedback and said another instructed resource includes a second of said queues also configured to provide said data availability stimulus from a second of said queue status.

13. The computer of claim 12, wherein said internal feedback includes a first feedback input and a second feedback input, each configured to provide data to a separate of said queues; and
wherein said external feedback forms a bidirectional binary tree with instances of said landings coupling upward to another instance of said landing to create a sequential feedback network;
wherein said computer further comprises a communication network between said cores using at least one version of said landings configured to receive from an output portal of said core and configured to present to said input portal to affect said queue.

14. The computer of claim 13, further comprising another of said instructed resource coupled with at least one of a local instruction processor and a sub-process index generator,
with said local instruction processor configured to at least partly respond to said data availability stimulus to generate a local instruction used to operate said instructed resource, and
with said sub-process index generator configured to respond to said data availability stimulus to create a sub-process index configured for use by one of said instructed resources to at least partly generate another local instruction for said one of said instructed resources; and wherein said sequential feedback network has a fixed latency and continuous throughput.

15. An apparatus implementing at least part of said computer of claim 1 with at least one of a disk drive, a download package, and a computer readable memory, with said apparatus containing at least one of a specification, a simulation, a product of simulating, a netlist, and a layout component;

wherein said Amdahl compliant algorithm includes a version of matrix inversion;

wherein said comparator includes at least one member of the group consisting of a comparator, a Floating Point (FP) comparator and a comparative FP adder;

wherein said multiplication generator includes one of a multiplier and a log-domain-circuit including an exponential calculator configured to receive a log-domain-result to create said multiplication.

16. An apparatus including at least part of said computer of claim 1, wherein said apparatus implements at least one of a disk drive, a handheld device, a wearable device, a cellular phone, a Digital Signal Processor (DSP), a numeric processor, a graphics accelerator, a base station, an access point, a micro-processor and a server.

* * * * *